United States Patent [19]

Gounares et al.

[11] Patent Number: 6,088,690
[45] Date of Patent: Jul. 11, 2000

[54] METHOD AND APPARATUS FOR ADAPTIVELY SOLVING SEQUENTIAL PROBLEMS IN A TARGET SYSTEM UTILIZING EVOLUTIONARY COMPUTATION TECHNIQUES

[75] Inventors: Alexander G. Gounares, Redmond; Stephen W. Spady, Issaguah, both of Wash.

[73] Assignee: Microsoft, Redmond, Wash.

[21] Appl. No.: 08/883,680

[22] Filed: Jun. 27, 1997

[51] Int. Cl.[7] .............................. G06N 3/00; G06N 3/12
[52] U.S. Cl. ............................................... 706/13; 714/38
[58] Field of Search ............................................... 706/13

[56] References Cited

U.S. PATENT DOCUMENTS

| | | | |
|---|---|---|---|
| 4,935,877 | 6/1990 | Koza | 706/13 |
| 5,136,686 | 8/1992 | Koza | 706/13 |
| 5,148,513 | 9/1992 | Koza et al. | 706/13 |
| 5,222,192 | 6/1993 | Shaefer | 706/13 |
| 5,581,657 | 12/1996 | Lyon | 706/13 |
| 5,708,774 | 1/1998 | Boden | 706/13 |

OTHER PUBLICATIONS

The Genetic Algorithm and Biological Development by Stewart W. Wilson at the Rowland Institute for Science in Cambridge, MA; pp. 247–251.

Electronic Ecosystem Evolving 'life' Fluorishes and Surprises in a Novel Electronic World by John Travis in the Science News, vol. 140, pp. 88–90.

Genetic Algorithms, Computer Programs that "evolve" in ways that resemble natural selection can solve complex problems even their creators do not fully understand by John H. Holland in Scientific American, Jul. 1992, pp. 66–72.

The Hitch–Hiker's Guide to Evolutionary Computation by Jorg Heitkotter posted Nov. 20, 1993, Issue 1.09.

Schultz, Alan C., Grefenstette, John J., and De Jong, Kenneth A., "Test and Evaluation by Genetic Algorithms." *IEEE Expert*, Oct. 1993, pp. 9–13.

Schultz, Alan C., Grefenstette, John J. and De Jong, Kenneth A., "Adaptive Testing of Controllers for Autonomous Vehicles." *IEEE*, pp. 158–164.

Grefenstette, John and Schultz, Alan, "An Evolutionary Apprach to Learning in Robots." Sections 1 through 5 (8 pages).

Forrest, Stephanie, and Mitchell, Melanie, "Relative Building–Block Fitness and the Building–Block Hypothesis." *Foundations of Genetic Algorithms 2*, 1993, pp. 109–126.

Forrest, Stephanie and Mitchell, Melanie, "What Makes a Problem Hard for a Genetic Algorithm? Some Anomalous Results and Their Explanation." Kluwere Academic Publishers, 1993, vol. 13, pp. 129–163.

Schultz, Alan C., "Learning Robot Behaviors Using Genetic Algorithms." pp. 1–6.

*Primary Examiner*—Tariq R. Hafiz
*Assistant Examiner*—Michael J Pender, Jr.
*Attorney, Agent, or Firm*—Banner & Witcoff, Ltd.

[57] ABSTRACT

A system for adaptively solving sequential problems in a target system utilizing evolutionary computation techniques and in particular genetic algorithms and modified genetic algorithms. Stimuli to a target system such as a software system are represented as actions. A single sequence of actions is a chromosome. Chromosomes are applied to the target system one action at a time and the change in properties of the target system is measured after each action is applied. A fitness rating is calculated for each chromosome based on the property changes produced in the target system by the chromosome. The fitness rating calculation is defined so that successive generations of chromosomes will converge upon desired characteristics. For example, desired characteristics for a software testing application are defect discovery and code coverage. Chromosomes with high fitness ratings are selected as parent chromosomes and various techniques are used to mate the parent chromosomes to produce children chromosomes. Children chromosomes with high fitness ratings are entered into the chromosome population. Defects in a target software system are minimized by evolving ever-shorter chromosomes that produce the same defect. Defect discovery rate, or any other desired characteristic, is thereby maximized.

43 Claims, 16 Drawing Sheets

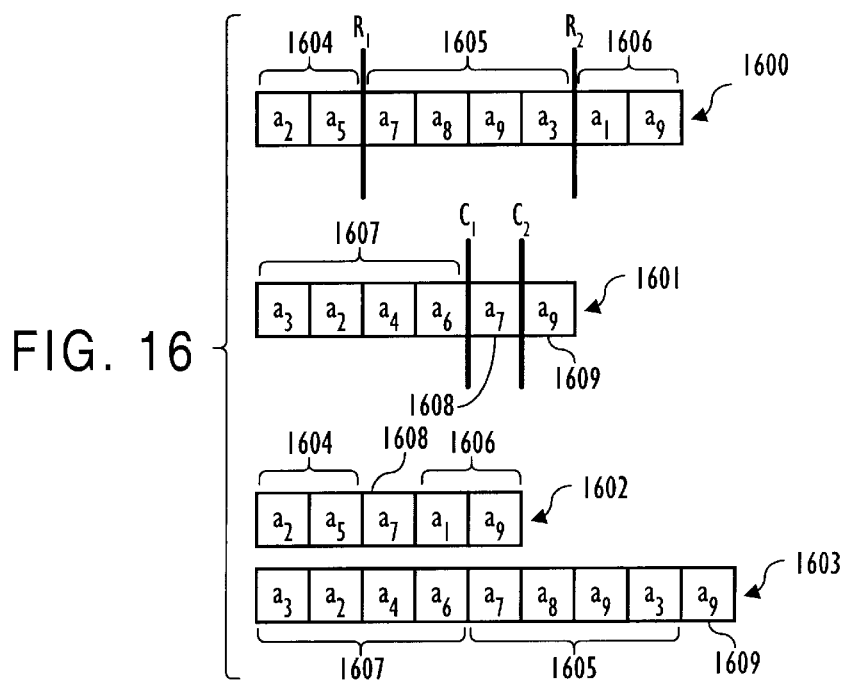

METHOD AND APPARATUS FOR ADAPTIVELY SOLVING SEQUENTIAL PROBLEMS IN A TARGET SYSTEM UTILIZING EVOLUTIONARY COMPUTATION TECHNIQUES

FIELD OF THE INVENTION

This invention relates to the field of problem solving utilizing artificial intelligence techniques. In particular, this invention relates to a method and apparatus utilizing Evolutionary Computation techniques for the adaptive solution of sequential problems. More particularly, the invention applies genetic algorithms for identifying certain software system behavior.

STATEMENT OF THE PROBLEM

Computers are essentially problem solving machines. Most computer systems are configured to solve a particular problem. The problem is known and defined and the computer provides the computational power to receive and process data to determine a solution within the framework of the defined problem. A more difficult computational challenge is presented by problems which are undefined or changing. These problems require a more human-like or thinking approach to find a solution. An example of such a problem is the testing of complex software systems. Complex computer software systems have a set of potential stimuli that approach infinity. Therefore the problem of selecting more interesting test cases (stimuli combinations) from the universe of possible test cases is one of great interest in the field of software testing.

The testing of software systems has become more difficult and more important as the complexity of software systems has increased. One reason software systems are tested is to identify defects. The system operation giving rise to the defects is then altered to ensure that the defects no longer occur. An objective of any software system testing approach is to maximize testing coverage and defect discovery rate. Ideally one needs to exercise every component or subsystem of a software system and do so with every permutation of possible stimuli in order to find every defect arising from every piece of the software system.

Present software systems are so complex that the number of permutations of possible stimuli approach infinity. It is not possible, within a reasonable amount of time, to fully exercise a complex software system to be sure that every defect has been discovered. Further, present software systems often include different types of software sub-systems which interact in order to bring about the over-all desired results. For example, a word processor such as Word allows the insertion of OLE objects within a Word document. One common example of this is an Excel worksheet inserted within a Word document. With existing software test systems one needs to know that choosing to insert an Excel worksheet into Word documents means switching from the Word environment to the Excel environment. This must be built into the model of the software system under test. Present test systems are capable of testing each sub-system individually but are not capable of testing the complex interactions between the sub-systems.

Existing software testing systems utilize traditional computing techniques. Existing software testing systems model the software system under test (the "target system" or the "target software system") as a discrete state machine. This requires a great deal of knowledge about the intended operation of the target system and a significant investment up-front to model the target system prior to testing. One result of the discrete state machine model used in existing testing systems is that existing testing systems are applicable to a specific target software system or at best a general class of target software systems. It is therefore not possible to dynamically test multiple, interacting target systems simultaneously using existing software testing systems. Another problem with the discrete state machine model of the target system is that testing criteria are not easily modified. In existing systems, the test system code must itself be modified if one wants to modify the criteria by which the test of the target system is conducted.

Given that there are an infinite number of inputs or stimuli that can be applied to a complex software system, selection of test cases is critical to maximizing testing coverage and defect discovery rate. A "test case" defines a set of input or stimuli to apply to a target system. Some existing software testing systems randomly select test cases. Other existing software testing systems use probabilistic methods to select test cases. For example, it might be known that a certain feature of a target system was particularly difficult to code and therefore one might decide to select test cases that will exercise that certain feature. Some existing software testing systems use Markov process modelling techniques to select test cases. Existing software testing systems are incapable of learning from past test cases and using that learning to select better or more interesting future test cases.

Once a defect is identified, current software testing systems offer no way to "minimize" the steps of the test case which produce the defect. For example, if a test of a target system results in a defect after 20 hours of continuous testing, there may be hundreds of thousands of inputs made to the target system during the test and no efficient way of determining which of those inputs or combination of inputs actually caused the defect to occur. To "minimize the defect" is to reduce the steps or actions of the test case down to the smallest set of steps that bring about the same defect produced by the larger test case.

There exists a need for an adaptive problem solving system. There exists a further need for a software testing system that selects more interesting test cases by learning from the results of previous test cases. There exists a further need for a software testing system that minimizes a defect-producing test case down to a minimum number of steps that produce the same defect. There exists a related need for a target system test representation that is flexibly applied to different types of target systems and allows for the efficient modification of test criteria. Finally, there exists a need for a software testing system capable of dynamically testing the interaction of multiple target software systems.

STATEMENT OF THE SOLUTION

The above identified problems, and others, are solved and a technical advance achieved in the field by the adaptive problem solving system of the present invention. A method and apparatus for applying hybrid Evolutionary Computation techniques is provided which enables a user to define a problem from which the system converges to a solution by evolving a population of organisms. In the case of the system of the present invention applied to a software testing application, the population of organisms are a population of test cases which can be applied to software system under test (a "target software system"). The system of the present invention evolves the population of organisms to select ever more "interesting" test cases where "interesting" is defined by the user. The system of the present invention learns from the results of past test cases to quickly select interesting test cases. One embodiment of the present invention defines "interesting" to mean that a test case produces high code coverage or finds a defect, thus test coverage and defect discovery rate are maximized. Of course, if the definition of "interesting" is modified for other embodiments of the invention, then other characteristics are maximized. When a defect in the target system is discovered, the test system of the present invention operates to minimize the number of steps in a test case to the minimum number of steps necessary to produce the defect. Minimization of the number of steps necessary to produce a defect makes the work of isolating, debugging and fixing defects easier thus less development time is required to fix defects. Increased testing coverage and the automatic generation of test cases means that more defects are found with less effort. Also, more defects are found earlier in the development cycle when they are easier and less expensive to fix. Thus the software testing system of the present invention greatly reduces the development time for a complex software system. Once found, test cases producing defects are minimized to ease the task of locating and correcting the defective operation of the target system.

Evolutionary algorithms provide a means to model biological evolutionary processes in computer-based problem solving systems. Evolutionary algorithms simulate the evolution of a population of organisms. Evolutionary Computation techniques are used to drive a population of organisms (test cases, in the case of the software testing system of the present invention) toward a solution. The example of a software testing system employing the adaptive problem solving system of the present invention illustrates the power of the present invention.

The main components of the software testing system of the present invention include a genetic testing engine and a product driver manager. The genetic testing engine generates test cases by implementing a hybrid genetic algorithm. The product driver manager manages communications between the genetic testing engine and the target software system(s) being tested. The target system could be either a software system with which an end user interacts through a user interface or a software system component consisting sorely of Application Programming Interfaces ("API's"). All interactions between the genetic test engine and the target software system are carried out through calls from the genetic testing engine to the product driver manager. The product driver manager in turn makes calls to a product driver that deals directly with the target software system.

The present invention uses a powerful representation of a target software system that is more compatible with genetic algorithm methods than existing discrete state machine representations. The basic premise of the dynamic genetic sequence state representation of the present invention is that any target software system is described completely by a set of actions that can be applied to the target system and a set of properties that can be obtained or observed from the target system. Each possible input or stimulus to the target software system is an "action". Multiple actions are grouped as "chromosomes". Each response by the target system to an action or chromosome is a "property". The concept of actions and properties provides a method of standardizing the interface to any software system. Different product drivers are provided for different target software systems. The actions and properties of various target software systems vary from one another but the dynamic genetic sequence state representation of the present invention allows the genetic testing engine to evolve test cases for any target system.

In general, the genetic testing engine of the present invention employs a hybrid genetic algorithm for selection of test cases. The genetic testing engine begins with a randomly selected population of chromosomes to be applied to a target system. Each chromosome of the initial population is applied to the target system and the changes in target system properties are measured. Chromosomes producing "interesting" property changes or defects in the target system are archived. "Interesting" is defined by the user. For example, an interesting chromosome might be one that produces a defect in the target system. The extent to which each chromosome produces interesting property changes is characterized by a "fitness" rating according to the property changes it produces in the target system. For example, when searching for defects, a chromosome that causes a defect to occur in the target system would be given a high fitness rating.

Pairs of chromosomes are selected as "parents" from the "most fit" of the chromosome population and those parent pairs are mated using various techniques to produce "children" chromosomes. Genetic operators or mutagens are then applied to the children chromosomes to produce new test case chromosomes. The chromosomes of the new population are applied to the target system through the product driver manager and their fitness is determined by observing the property changes of the target system generated in response to application of each child chromosome. This process is iterated to produce continually more interesting results or, in other words, "more fit" chromosomes or test cases.

Relative fitness between two chromosomes producing the same defect is determined, in part, by the comparative length of the two defect-producing chromosomes. Whereas relative fitness between two non-defect-producing chromosomes is determined, in part, by which of the two chromosomes exercises the larger amount of code or produces the most change in measured properties as well as the comparative length of the two defect-producing chromosomes. Proper definition of the fitness criteria for both cases, defect producing chromosomes and non-defect-producing chromosomes, ensures a proper balance between narrowly focussing in on defects and broad test coverage of the target system. Minimization of a defect-producing chromosome is accomplished by evolving the defect-producing chromosome where a shorter chromosome producing a defect is deemed more fit than the longer chromosome producing the same defect.

While testing a first target system, the product driver manager watches for system events and instances where a second target software system becomes the active process. The above example of the insertion of an Excel worksheet in a Word document is one where the testing process switches from a first target system to a second target system. When the active process switches from the first target system to the second target system, the product driver manager first determines that a product driver exists for the second target system. If it finds a product driver for the second target system, the product driver manager notifies the genetic testing engine of the change so that testing can continue on the second target software system. The product driver manager and unique product drivers for each target software system provide a dynamic virtual driver architecture for interacting with and controlling multiple, interacting software systems. As long as a product driver exists for a software system, the genetic testing engine and product driver manager of the present invention can be used to test that software system.

The software testing system of the present invention can be configured to seek any type of behavior that can be measured directly or expressed indirectly by measured property changes including, but not limited to, defects. The user simply needs to set the fitness criteria such that test chromosomes are evolved to elicit the desired behavior from the target system.

BRIEF DESCRIPTION OF THE FIGURES

FIG. 16 is a schematic view of chromosomes to which delta-based cross-over is applied.

FIGS. 17–18 are property delta vector arrays utilized in a delta-based cross-over technique.

FIG. 19 is a schematic view of parent chromosomes in one step of the iterative delta-based cross-over technique.

FIG. 20 is a property delta comparison array relating to the parent chromosomes of FIG. 19.

DETAILED DESCRIPTION

The field of Evolutionary Computation represents one branch of a larger field sometimes referred to as Computational Intelligence. The field of Evolutionary Computation itself includes numerous branches all characterized by application of biological observations to machine learning and problem solving. The algorithms developed in the field of Evolutionary Computation are referred to as Evolutionary Algorithms for their grounding in the concepts of natural selection and survival of the fittest, i.e., the "theory of evolution".

Evolutionary Algorithms use models of evolutionary processes as components in the design of computer-based problem solving systems. Numerous computational models have been proposed including Genetic Algorithms, Evolutionary Programming, Evolution Strategies, Classifier Systems and Genetic Programming. The various computational models share a common base of simulating the evolution of individual structures via processes of selection, mutation and reproduction. The evolutionary process depends on the performance of individuals in the population as defined by the environment. Evolutionary Algorithms maintain a population of individuals that evolve according to rules of selection and other operators that are referred to as Genetic Operators. Examples of Genetic Operators are recombination and mating. Each individual in the population receives a measure of fitness. Fitness is determined by the environment. Reproduction focusses on high fitness individuals. Mating and mutation perturb the individuals of the first generation producing a new population of individuals. Research in Evolutionary Algorithms has applied the Algorithms in the development of adaptive problem solving techniques.

Although one embodiment of the present invention relates to the field of software testing systems, those skilled in the art recognize that software testing systems are simply exemplary of the possible applications for the adaptive problem solving system of the present invention.

Figure 24:
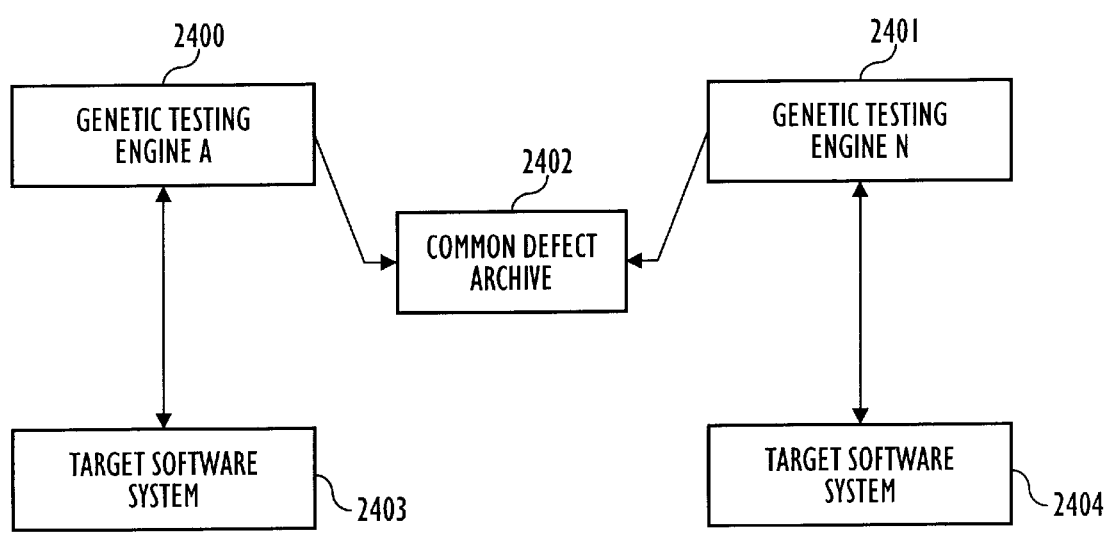
FIG. 24 is a block diagram depicting a system according to the present invention employing multiple genetic testing engines.
Figure 25:
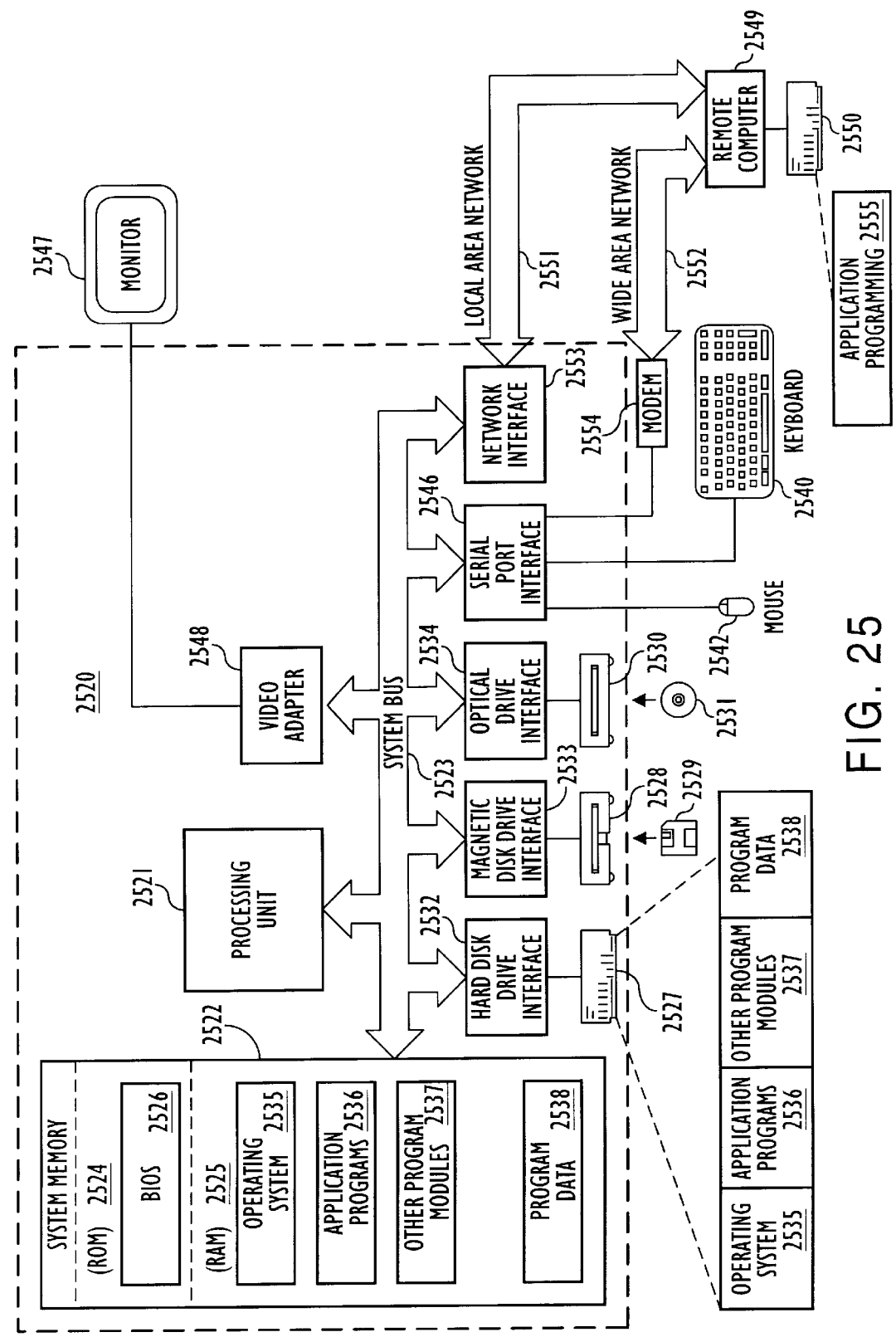
FIG. 25 is a block diagram of an exemplary operating environment for the present invention.

A computing environment in general is described with respect to FIG. 25. The over-all inventive system is generally described with respect to FIG. 1. Operation of the genetic testing engine is described with respect to FIGS. 2–22. The architecture and operation of the product driver manager and the product driver(s) is described with respect to FIGS. 23–24.

Computing Environment In General—FIG. 25

FIG. 25 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 25, an exemplary system for implementing the invention includes a general purpose computing device in the form of a conventional personal computer 2520, including a processing unit 2521, a system memory 2522, and a system bus 2523 that couples various system components including the system memory to the processing unit 2521. The system bus 2523 may be any of several types of bus structures including a memory bus or memory controller, a peripheral bus, and a local bus using any of a variety of bus architectures. The system memory includes read only memory (ROM) 2524 and random access memory (RAM) 2525. A basic input/output system 2526 (BIOS), containing the basic routines that helps to transfer information between elements within the personal computer 2520, such as during start-up, is stored in ROM 2524. The personal computer 2520 further includes a hard disk drive 2527 for reading from and writing to a hard disk, not shown, a magnetic disk drive 2528 for reading from or writing to a removable magnetic disk 2529, and an optical disk drive 2530 for reading from or writing to a removable optical disk 2531 such as a CD ROM or other optical media. The hard disk drive 2527, magnetic disk drive 2528, and optical disk drive 2530 are connected to the system bus 2523 by a hard disk drive interface 2532, a magnetic disk drive interface 2533, and an optical drive interface 2534, respectively. The drives and their associated computer-readable media provide nonvolatile storage of computer readable instructions, data structures, program modules and other data for the personal computer 2520. Although the exemplary environment described herein employs a hard disk, a removable magnetic disk 2529 and a removable optical disk 2531, it should be appreciated by those skilled in the art that other types of computer readable media which can store data that is accessible by a computer, such as magnetic cassettes, flash memory cards, digital video disks, Bernoulli cartridge, random access memories (RAMs), read only memories (ROM), and the like, may also be used in the exemplary operating environment.

A number of program modules may be stored on the hard disk, magnetic disk 2529, optical disk 2531, ROM 2524 or RAM 2525, including an operating system 2535, one or more application programs 2536, other program modules 2537, and program data 2538. A user may enter commands and information into the personal computer 2520 through input devices such as a keyboard 2540 and pointing device 2542. Other input devices (not shown) may include a microphone, joystick, game pad, satellite dish, scanner, or the like. These and other input devices are often connected to the processing unit 2521 through a serial port interface 2546 that is coupled to the system bus, but may be connected by other interfaces, such as a parallel port, game port or a universal serial bus (USB). A monitor 2547 or other type of display device is also connected to the system bus 2523 via an interface, such as a video adapter 2548. In addition to the monitor, personal computers typically include other peripheral output devices (not shown), such as speakers and printers.

The personal computer 2520 may operate in a networked environment using logical connections to one or more remote computers, such as a remote computer 2549. The remote computer 2549 may be another personal computer, a server, a router, a network PC, a peer device or other common network node, and typically includes many or all of the elements described above relative to the personal computer 2520, although only a memory storage device 2550, including application programming 2555, has been illustrated in FIG. 25. The logical connections depicted in FIG. 25 include a local area network (LAN) 2551 and a wide area network (WAN) 2552. Such networking environments are commonplace in offices, enterprise-wide computer networks, intranets and the Internet.

When used in a LAN networking environment, the personal computer 2520 is connected to the local network 2551 through a network interface or adapter 2553. When used in a WAN networking environment, the personal computer 2520 typically includes a modem 2554 or other means for establishing communications over the wide area network 2552, such as the Internet. The modem 2554, which may be internal or external, is connected to the system bus 2523 via the serial port interface 2546. In a networked environment, program modules depicted relative to the personal computer 2520, or portions thereof, may be stored in the remote memory storage device. It will be appreciated that the network connections shown are exemplary and other means of establishing a communications link between the computers may be used.

Figure 1:
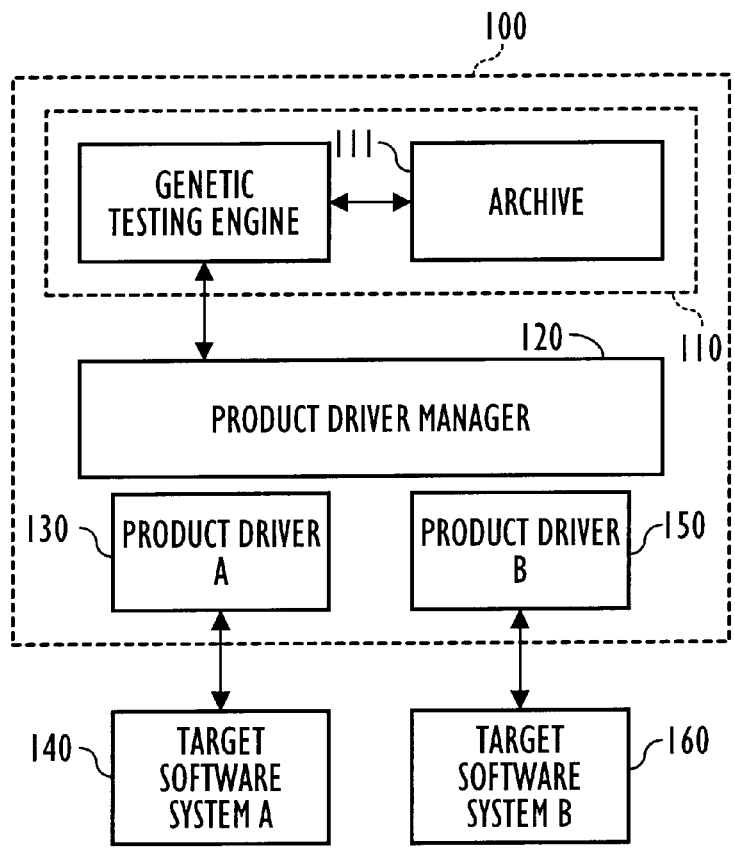
FIG. 1 is a block diagram illustrating the major components of the software testing system of the present invention.

Testing System In General—FIG. 1

The present invention utilizes the basic concepts of Evolutionary Algorithms to search for and optimize behavior, including defects, in a target software system. FIG. 1 is a block diagram illustrating the basic organization of the testing system of the present invention. Software testing system 100 includes genetic testing engine 110. Genetic testing engine 110 generates test cases, as described below. Genetic testing engine 110 includes archive 111. Archive 111 stores "interesting" test cases including the actions and corresponding properties of a test case. Test cases generated by genetic testing engine 110 are applied to target software systems 140, 160 through product driver manager 120 and product drivers 130, 150. Product drivers 130, 150 are responsible for communicating directly with target systems 140, 160. Communications between product drivers 130, 150 and target systems 140, 160 consist of test cases applied to target systems 140, 160 by product drivers 130, 150 and corresponding, responsive properties of target systems 140, 160 measured by product drivers 130, 150. Product driver manager 120 manages the interactions between genetic testing engine 110 and the product drivers 130, 150.

The architecture of a product driver manager and product drivers is not critical to the practice of the present invention. This approach does, however, simplify the genetic testing engine design and aids the dynamic testing of multiple target software systems. The operation of system 100 is described in greater detail with respect to FIGS. 23–24.

Figure 2:
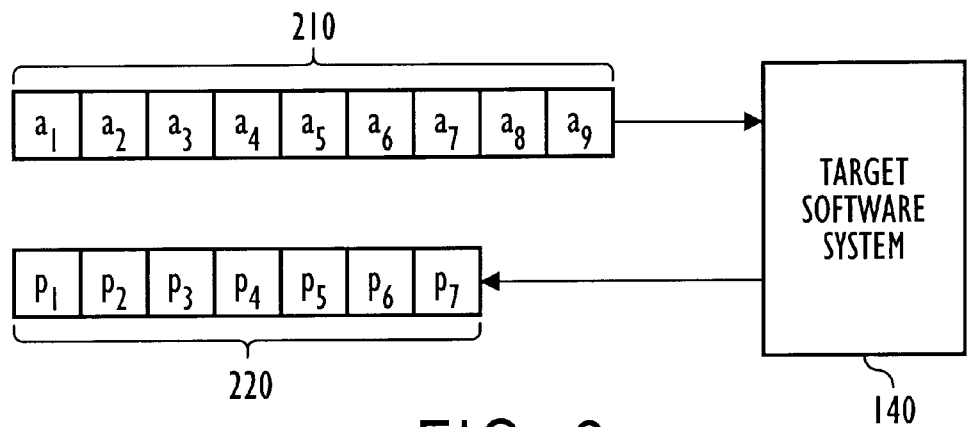
FIG. 2 is a schematic representation of the Dynamic Genetic Sequence State representation of the present invention.
Figure 3:
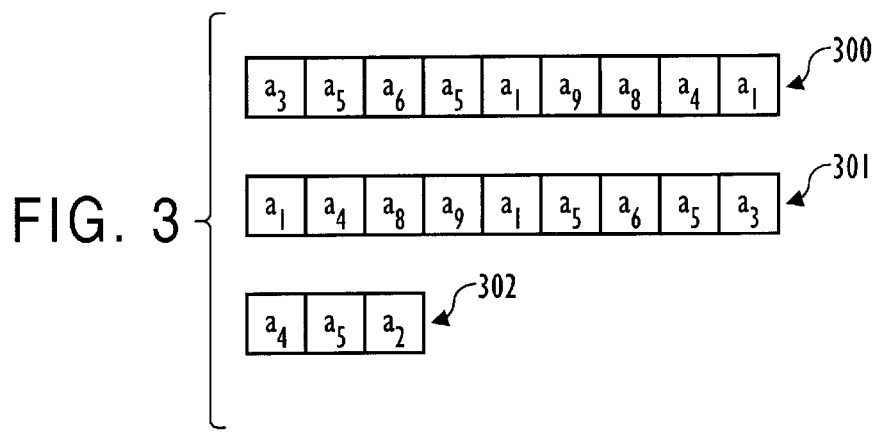
FIG. 3 is a schematic representation of exemplary chromosomes.

Dynamic Genetic Sequence State Representation—FIG. 2–3

The operation of the genetic testing engine, described with respect to FIGS. 4–22, is best understood within the context of the representation of the target system used by the system of the present invention. In order to test a target software system using test cases generated by the genetic testing engine, the target system must be expressed in a language that is understood and manipulatable by the genetic testing engine. The Dynamic Genetic Sequence State ("DGSS") representation of the present invention allows for arbitrary lengths and combinations of input stimuli. This allows for accurate simulation of realistic testing scenarios. The DGSS representation utilizes a basic premise that any software system can be described completely by its actions and properties. As noted above, an action is a stimulus that can be applied to the target system and a property is a response or behavior that can be obtained or observed from the system. The DGSS representation serves as a tool for standardizing the interface between a software testing system and any target software system.

FIG. 2 illustrates target software system 140, its action set 210 and its property set 220. Target software system 140 is defined solely by its action set 210 and property set 220. Action set 210 is made up of actions $a_1$ through $a_9$. Each action in action set 210 represents a stimulus to target system 140. For example, action $a_1$ is described as "<'a'>" and action $a_2$ is described as "<enter>". Property set 220 is comprised of properties $p_1$ through $p_7$. Each property in property set 220 represents an attribute or characteristic that is obtained or observed from the target system. For example, property $p_1$ is described as "the number of characters in a document" and property $p_5$ is described as "the number of selected characters in a document".

In the testing system of the present invention, a test case is represented as an arbitrary length sequence of actions called a "chromosome". A chromosome only specifies the combination and order of actions for a test case. A chromosome does not explicitly specify an expected effect of applying its actions to a target system. Table 1 includes an exemplary set of action definitions for actions $a_1$ through $a_9$.

TABLE 1

| ACTION | DESCRIPTION |
|---|---|
| $a_1$ | <'a'> |
| $a_2$ | <enter> |
| $a_3$ | <Right Arrow Key> |
| $a_4$ | <Left Arrow Key> |
| $a_5$ | <Shift> + <Left Arrow Key> |
| $a_6$ | <Shift> + <Right Arrow Key> |
| $a_7$ | <Edit/Copy> |
| $a_8$ | <Edit/Paste> |
| $a_9$ | <Edit/Undo> |

The nine actions, $a_1$–$a_9$, making up action set 210 of FIG. 2 can be arranged in numerous ways to produce chromosomes for application to target system 140. The actions defined by a chromosome are determined by mapping the action identifier, i.e., $a_1$–$a_9$, onto the action description table, i.e. Table 1. FIG. 3 illustrates three different chromosomes 300–302 comprised of actions from action set 210. Chromosome 300 produces a test case with the following sequential steps:

| Step 1. | <Right Arrow Key> |
|---|---|
| Step 2. | <Shift> + <Left Arrow Key> |
| Step 3. | <Shift> + <Right Arrow Key> |
| Step 4. | <Shift> + <Left Arrow Key> |
| Step 5. | <'a'> |
| Step 6. | <Edit/Undo> |
| Step 7. | <Edit/Paste> |
| Step 8. | <Left Arrow Key> |
| Step 9. | <'a'> |

Chromosome 301 and chromosome 302 each produce a test case having a different set of sequential steps. A chromosome defines the actions to be applied to a target system and the order of their application.

The DGSS representation uses a similar approach for the representation of properties. Properties are characteristics of the software system under test. Some properties are observable characteristics, e.g. the number of characters in an open document. Other properties are normally hidden to the user of the software system under test, e.g. the amount of free memory left in the system. Table 2 includes exemplary property definitions for properties $p_1$–$p_7$.

TABLE 2

| ACTION | NAME | DESCRIPTION |
|---|---|---|
| $p_1$ | cch | Number of characters in document |
| $p_2$ | cpSelBegin | Selection begin character index |
| $p_3$ | cpSelEnd | Selection end character index |
| $p_4$ | cLines | Number of lines in document |
| $p_5$ | cchSelection | Number of characters in selection |
| $p_6$ | fReadOnly | Document is Read Only |
| $p_7$ | fClipboard | Text is on the clipboard |

Assuming properties $p_1$–$p_7$ represent the total characteristics of the software system under test, then the effect of each action applied to the system under test can be described by the changes that occur to properties $p_1$–$p_7$ as a result of the action. It is the measure of the change in properties that is of interest in the system of the present invention.

There are several constructs that are helpful for expressing and utilizing the changes in properties. All of these constructs are referred to generally as "property delta vectors". A property delta vector is an array of changes to each property characterizing a software system under test. One type of property delta vector is an "action state delta". An action state delta is an array of property deltas for a given action applied to the system under test. For example Table 3 illustrates an exemplary set of values for properties $p_1$–$p_7$ before and after the application of an action $a_1$ to a software system under test.

TABLE 3

|  | $p_1$ | $p_2$ | $p_3$ | $p_4$ | $p_5$ | $p_6$ | $p_7$ |
|---|---|---|---|---|---|---|---|
| Before $a_1$ | 0 | 0 | 1 | 1 | 0 | 0 | 0 |
| After $a_1$ | 1 | 1 | 0 | 1 | 0 | 0 | 0 |

Table 4, an action state delta, summarizes the differences between the properties after application of the action and the properties before application of the action.

TABLE 4

|  | $p_1$ | $p_2$ | $p_3$ | $p_4$ | $p_5$ | $p_6$ | $p_7$ |
|---|---|---|---|---|---|---|---|
| Difference | +1 | +1 | −1 | — | — | — | — |

In the notation of an action state delta, a "+X" or "−X" indicates a change in the value of a property. A "−" indicates no change in the value of a property. Thus in the above example of Tables 3–4, properties $p_1$–$p_3$ changed and properties $p_4$–$p_7$ did not change when action $a_1$ was applied to the software system under test.

An action state delta is used to determine how the target system is affected by each individual action of a chromosome as it is applied to the target system. An action state delta can be used for at least two purposes. One use is to determine whether the action had some affect on the target system. Another use is to determine if a certain expected effect was had on the target system. The verification aspect of properties is where "action verification deltas" are used. An action verification delta is an array of property delta expressions that convey what we expect to happen in the target system when a particular action is applied. Table 5, for example, illustrates the changes one expects to occur in the set of target system properties when action $a_1$ (<'a'>) is applied to the system.

TABLE 5

|          | $p_1$ | $p_2$ | $p_3$ | $p_4$ | $p_5$ | $p_6$ | $p_7$ |
|----------|-------|-------|-------|-------|-------|-------|-------|
| Expected | +1    | +1    | −1    | —     | —     | —     | —     |

Whenever a chromosome is applied to the target system, the system of the present invention iterates through the chromosome and applies each action individually. After each action is applied, an action state delta is computed for each action. An action state delta can then be compared to the action verification delta for the action that was applied. If the values in the action state delta and the action verification delta do not match, then the target system did not do what was expected and a defect has been found. Comparing the action state delta of Table 4 and the action verification delta of Table 5 it is seen that no defect occurred when action $a_1$ was applied to the target software system. The notation used in the action state delta of Table 4 and the action verification delta of Table 5 can be expanded with any notational conveniences that are helpful for a particular application. For example, Table 6 is an alternative expression of the action verification of Table 5 utilizing some additional notational conveniences.

TABLE 6

|          | $p_1$       | $p_2$ | $p_3$   | $p_4$ | $p_5$ | $p_6$ | $p_7$ |
|----------|-------------|-------|---------|-------|-------|-------|-------|
| Expected | Prev($p_4$) | +1    | =$p_2$  | —     | —     | —     | —     |

Where an expected property value depends upon the previous value of another property before the action was applied, the notation convention of property $p_1$ in Table 6 is used. "Prev($p_4$)" indicates that the value of property $p_1$ after the application of action $a_1$ should be the value of property $p_4$ before the application of action $a_1$. An "=" is used where an expected property value should equal another property value such as indicated in Table 6 for property $p_3$. The "=$p_2$" notation indicates that the value of property $p_3$ should equal the value of property $p_2$.

A further type of property delta vector is an "action constraint". An action constraint is an array of property expressions that must be satisfied for a particular action to be applied to the target system. An example of an action constraint is given below in Table 7.

TABLE 7

|             | $p_1$ | $p_2$ | $p_3$ | $p_4$ | $p_5$ | $p_6$ | $p_7$ |
|-------------|-------|-------|-------|-------|-------|-------|-------|
| Constraints | >0    | >0    | >0    | —     | >0    | —     | —     |

The action constraint defines for each property an expression that must be satisfied. If any of these conditions are not satisfied, then application of the action does not occur and the action is treated as a No-Operation ("NOP"). This is useful for cases where applying an action simply isn't allowed and doing so would be considered bad behavior. For example, a set of API's has a set of actions that do things like create a bitmap and then other actions operate on that bitmap. The designers of these API's fully expect the end users to always make sure they have a valid bitmap before calling some of the other API's. In this case, one would define action constraints for those API's that require an existing, valid bitmap so that test case actions which did not conform to these requirements would not be erroneously executed on the target system.

One skilled in the art recognizes that different representation systems could be used as alternatives to the DGSS representation described with respect to FIGS. 2–3 and Tables 1–7. It is only necessary to provide a representation system that allows the genetic testing engine to interface in a generic fashion with a variety of different target systems.

Evolving Test Cases Using the Genetic Testing Engine—FIG. 4–22

Figure 4:
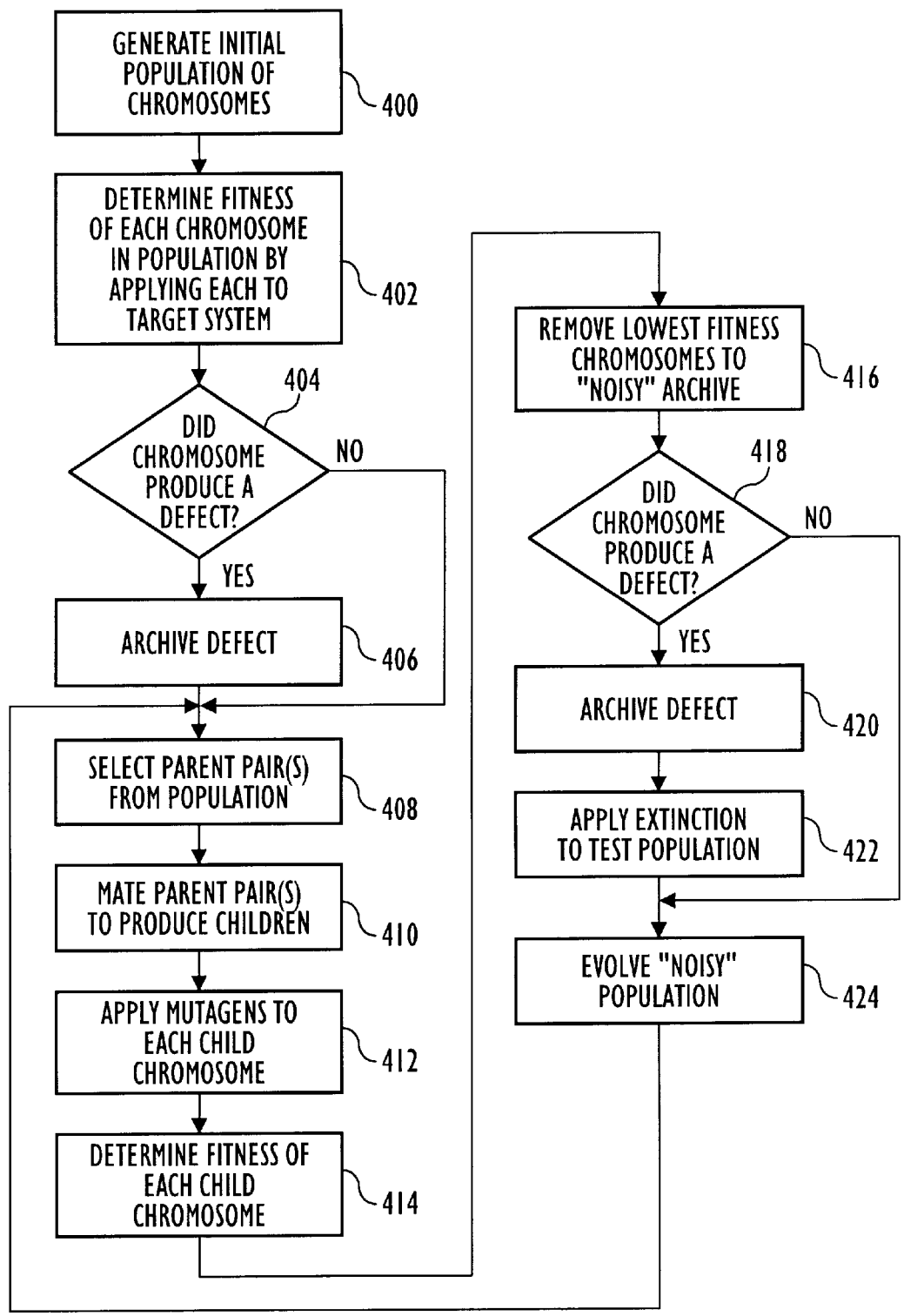
FIG. 4 is a flow chart of the general operation of the genetic testing engine of the present invention.

FIG. 4 is a flow diagram illustrating the basic steps comprising the methods of the genetic testing engine of the present invention. The processing steps illustrated in FIG. 4 are described to provide an over-all framework for more detailed explanation with respect to the remaining FIGS.

During step 400 an initial population of chromosomes is generated. For the initial test of a target software system, the initial test population of chromosomes is randomly generated during step 400. For subsequent tests of the target system then the initial test population can be compiled from chromosomes archived, as discussed below, during previous tests. Processing next continues to step 402.

During step 402 the fitness of each chromosome in the initial test population is determined. The fitness of a chromosome is determined by the genetic testing engine of the present invention by applying the chromosome to the target system and measuring the change in properties resulting from application of the chromosome. Fitness criteria, as discussed below, are used to rate the fitness of the chromosome. For each chromosome, it is determined during step 404 if the chromosome produced a defect in the target system. If a chromosome produces a defect then the chromosome is archived by the operation of step 406. Once the fitness of all the chromosomes in the initial population has been determined and all defect-producing chromosomes have been archived, processing continues to step 408.

The genetic testing engine of the present invention operates during processing step 408 to select "parent pair(s)" of chromosomes from the chromosome population. A parent pair of chromosomes is selected using the fitness ratings of the chromosome population. Chromosomes having higher fitness ratings are more likely to be selected as parents. Those skilled in the art of evolutionary computation recognize that there are numerous methods by which one can select parent pairs based on chromosome fitness ratings. Roulette selection with scaling is used in one embodiment of the present invention but other methods include, but are not limited to, tournament selection or roulette selection. Having selected the parent pairs of chromosomes, processing continues to step 410.

The genetic testing engine of the present invention operates during processing step 410 to "mate" the parent pair of chromosomes. The process by which a parent pair of chromosomes is mated is called "crossover". As discussed with respect to FIGS. 5–10 and 16–22, the genetic testing engine of the present invention utilizes several types of crossover. Some cross-over methods use a sequence-based approach and some use a delta-based approach to preserve the common genetic material orderings between parent chromosomes and their "children". The system of the present invention can also be configured to skip step 410 (mating) and continue directly to application of mutagens. Each mating of a chromosome parent pair results in children chromosomes. Processing of the genetic testing engine of the present invention proceeds from step 410 to step 412.

During processing step 412, the genetic testing engine operates to apply mutagens or genetic operators (hereinafter "mutagens") to the children chromosomes. Application of a mutagen to a chromosome disturbs the genetic makeup of the chromosome. The use of mutagens supplements the mating step in evolving chromosomes. The genetic testing engine utilizes a variety of mutagens to alter the children chromosomes. The mutagens and their operation are discussed in more detail with respect to FIGS. 11–14. Processing next proceeds to step 414.

Processing step 414 is similar to processing step 402. During step 414, the fitness of each child chromosome is determined using the same fitness rating system utilized in processing step 402 to determine the fitness of the original chromosome population. The children chromosomes are then inserted into the chromosome population. Determining the fitness of a chromosome, whether a chromosome from the original population or a child chromosome, is discussed in more detail with respect to FIG. 22.

During step 416 the chromosomes having the lowest fitness are removed from the population and are archived in a "noisy" archive. The chromosomes of the noisy archive are discussed again with respect to step 424. Processing next proceeds to step 418.

As is done with the original chromosome population, any children chromosomes producing defects are identified by operation of decision block 418. Chromosomes that produce a defect in the target software system are stored in the archive by operation of step 420. If a chromosome does not produce a defect then processing continues from step 418 to step 424. After the defect-producing chromosomes have been archived by operation of step 420, processing proceeds to step 422.

During processing step 422 the "Extinction" operator is applied to the chromosome test population. Extinction is used to identify when the genetic testing engine is producing test cases that are too similar. This typically means that the genetic testing engine has converged toward a particular defect. When this occurs, the defect is identified as extinct and all the chromosomes of the test case population are "killed off". A new test case population is generated and the evolution process begins anew. Chromosomes which produce the extinct defect are given a relatively low fitness rating so that the genetic engine does not seek out the already identified and minimized extinct defect. Alternatively, chromosomes which produce the extinct defect are themselves made extinct (removed from the population). Extinction is discussed in more detail with respect to FIG. 15.

The noisy archive is populated with low fitness chromosomes removed from the test population by operation of step 416. Although not shown in FIG. 4, step 424 represents a series of steps to evolve the noisy population substantially similar to steps 408–416 used to evolve the test population. Evolving the noisy population is discussed in more detail below.

Each cycle of steps 408–416 represents one "generation" of operation of the genetic testing engine of the present invention. Processing returns from step 424 to step 408. With each successive generation the test chromosome population becomes more fit. FIG. 4 has been described above with respect to searching for defects. This means that the fitness ratings value a defect-producing chromosome over a non-defect producing chromosomes. One skilled in the art recognizes that the fitness ratings can be defined to seek out any type of behavior of which defective behavior is only one example.

Figure 22:
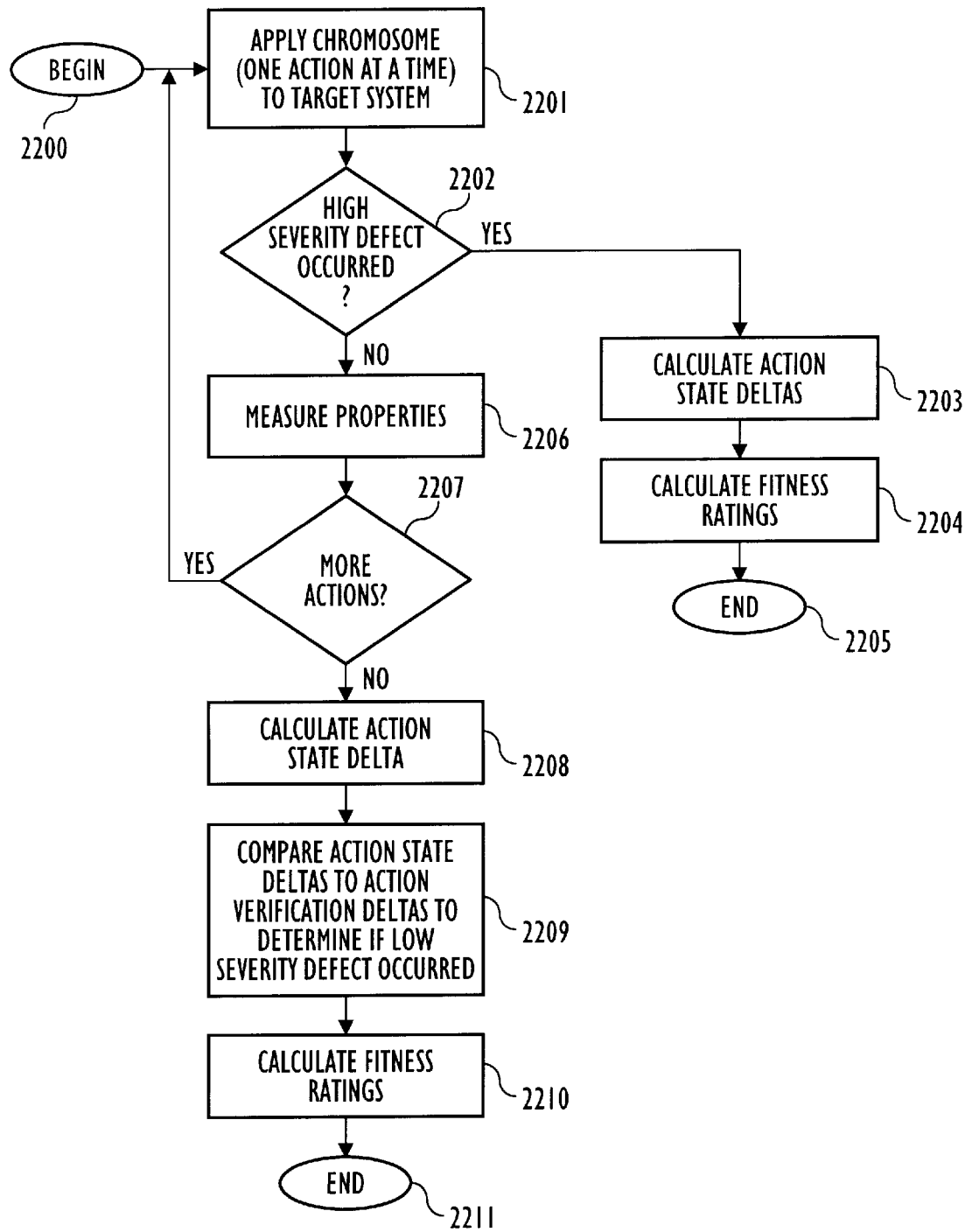
FIG. 22 is a flow chart illustrating the process for the assignment of fitness ratings to chromosomes.

Determining Chromosome Fitness—FIG. 22

The fitness of a chromosome is defined to suit a particular application of the present invention. For the example of the software testing system according to the present invention, the fitness of a chromosome is a function of the change in the target system produced by the chromosome, whether the chromosome produces a defect and the overall length of the chromosome. EQU. 1 below, illustrates the form of the fitness equation used by the software testing system according to the present invention.

$$\text{fitness} = \frac{(\text{sum of property changes}) + K(\text{produces defect? T:1.0, F:0.0})}{(\text{length of chromosome})} \quad (1)$$

Each chromosome in the test population receives a fitness rating according to EQN. 1. EQN. 1 includes a component related to the change in the target system produced by the chromosome (sum of property changes) measured using action state deltas. If a chromosome does not produce a defect then the constant K is multiplied by zero. If a chromosome does produce a defect then the constant K is multiplied by one. Thus the fitness rating for a non-defect producing chromosome is a function of the action state deltas (sum of property changes) for the actions comprising the chromosome and the length of the chromosome. The fitness rating for a defect producing chromosome is a function of the actions state deltas (sum of property changes), the length of the chromosome and an additional amount (K) due to the produced defect. Defect-producing chromosomes therefore receive a higher fitness rating than non-defect-producing chromosomes and between two chromosomes that produce the same property changes and/or defects, the shorter chromosome generates the higher fitness rating.

FIG. 22 illustrates the process steps necessary each time the fitness of a chromosome is determined. The fitness rating process begins with element 2200 and proceeds to step 2201. During step 2201 the actions comprising the chromosome for which the fitness is to be determined are applied one at a time to the target software system. For each action applied to the target system, it is determined whether a high-severity defect occurred by operation of decision block 2202. A high-severity defect is a defect precluding the meaningful continuation of the test, e.g. a system crash. If a high severity defect has occurred then steps 2203–2205 are processed, as described below, otherwise processing continues to step 2206. The property changes of the target system are measured during step 2206. Steps 2201–2206 iterate, by operation of decision block 2207 for as many cycles as there are actions comprising the chromosome unless there is a high-severity defect identified by operation of decision block 2202. Once each action of the chromosome has been applied to the target system, processing continues to step 2208.

During step 2208 the action state deltas for the chromosome are determined. The action state deltas are compared, during step 2209, to the action verification deltas for the chromosome to determine if a low-severity defect occurred. A low-severity defect is a defect that does not preclude the meaningful continuation of the test of the target system. The action state deltas and whether or not a defect occurred are applied to a fitness algorithm such as EQN. 1 during step 2210. The user defines a fitness algorithm to bring about the desired operation of the present invention. EQN. 1 is merely exemplary of one format (for maximizing test coverage and defect discovery rate) for the fitness function of the system of the present invention. Processing concludes with step 2211.

In the event a high-severity defect is identified by operation of decision block 2202, processing continues to step 2203 where the action state deltas are calculated for those actions that have been applied to the target system. Processing continues to step 2204 where the fitness rating is calculated as described with respect to step 2210. Processing then concludes with step 2205.

As noted previously, EQN. 1 is one example of a fitness equation for use with the system of the present invention. An embodiment of the present invention is a software testing system for which it is desired to maximize test coverage and defect discovery rate therefore the fitness equation favors short, defect-producing chromosomes and short chromosomes that exercise a large amount of code. For other applications one might define fitness equations for any specific purpose.

Mating of Parent Chromosomes—FIGS. 5–10

According to the operation of the genetic testing engine of the present invention, chromosomes reproduce, or mate, as described with respect to step 410 of FIG. 4, using a method called crossover. There are basically three methods of crossover employed by the present invention. Simple n-point crossover is described with respect to FIGS. 5–6. Two forms of sequence-based crossover, which take into account the order of the actions within the parent chromosomes, are described with respect to FIGS. 7–10. Delta-based crossover, which takes into account chromosome action state deltas, is described with respect to FIGS. 16–21. Sequence-based cross-over or delta-based cross-over are the preferred crossover methods since, as described below, these methods preserve the ordering information of the mated parents in the produced children. Simple n-point crossover does not preserve the ordering information of the mated parents in the produced children. Thus children produced from sequence-based or delta-based cross-over tend to "resemble" their parents more than children produced by simple n-point cross-over.

Figure 5:
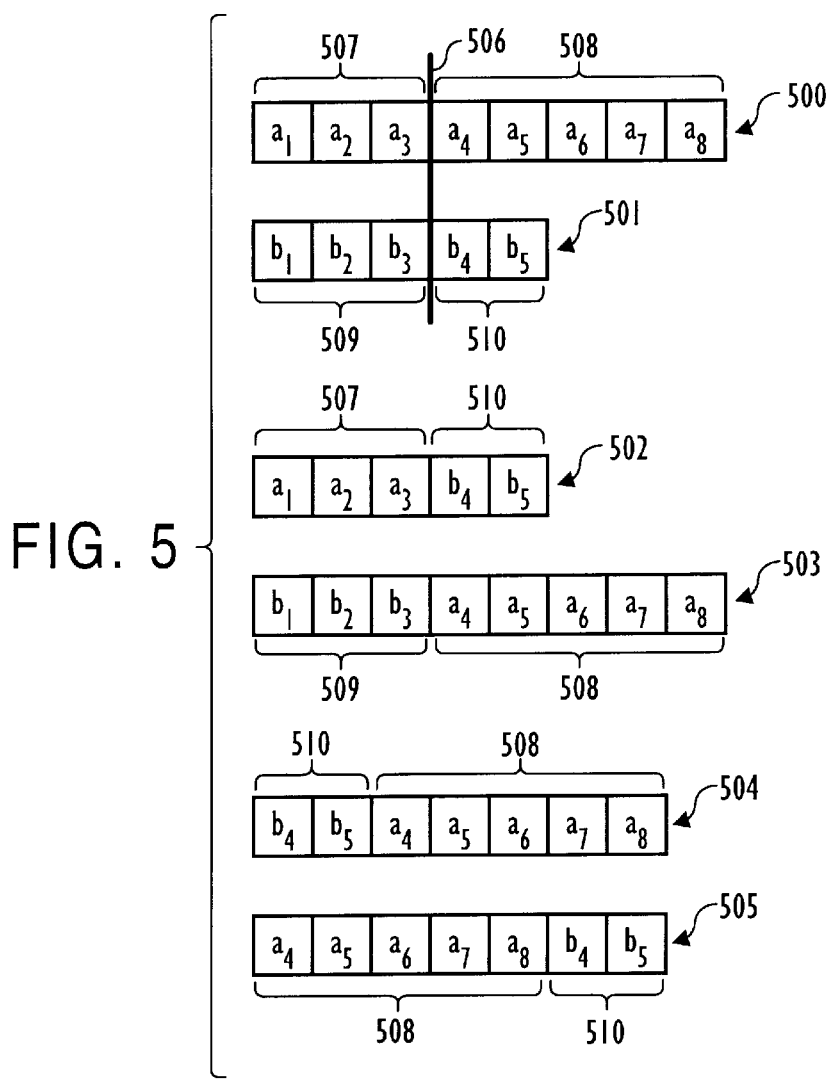
FIG. 5 is a schematic representation of chromosomes to which simple one point cross-over is applied.
Figure 6:
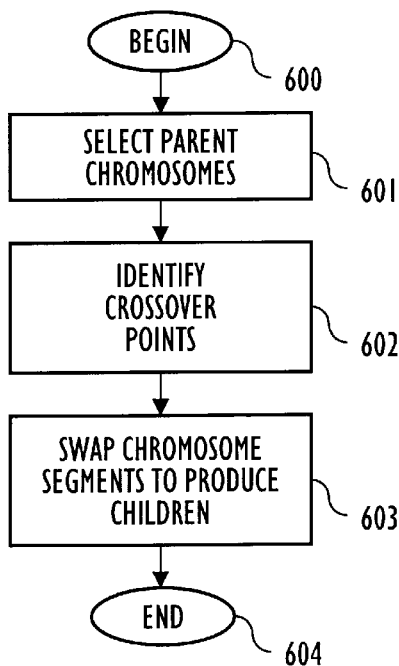
FIG. 6 is a flow chart illustrating the steps of n-point cross-over.

Simple n-Point Crossover—FIGS. 5–6

FIG. 5 illustrates a simple n-point crossover between a parent pair of chromosomes 500–501. FIG. 5 illustrates an example of one-point cross-over. A single cross-over point 506 is selected. Chromosome segments of parents 500–501 are then swapped to produce children 502–503. Child 502 is comprised of chromosome segment 507 of parent 500 and chromosome segment 510 of parent 501. Child 503 is comprised of chromosome segment 509 of parent 501 and chromosome segment 508 of parent 500. Because the ordering or sequence of actions is not maintained in n-point cross-over, additional children chromosomes can be, if desired, compiled from the various chromosome segments of parent chromosomes 500–501. Children 504–505 are optional children chromosomes formed by one-point cross-over between parents 500–501.

FIG. 6 is a flow chart illustrating the steps by which the genetic testing engine performs a simple n-point crossover on a parent pair of chromosomes. The n-point cross-over process begins with element 600 and proceeds to step 601 where the parent chromosomes are selected or received as described with respect to step 408 of FIG. 4. Processing then proceeds to step 602. During step 602 the cross-over point(s) are selected. One cross-over point is selected in the case of a one-point cross-over, two cross-over points are selected in the case of a two-point cross-over, and so on. Selection of the cross-over point(s) defines the chromosome segments in each parent chromosome that will be combined to form the children chromosomes. During step 603 the chromosome segments are swapped to form the children chromosomes. As noted, the sequencing of the parent chromosomes is not preserved in the children chromosomes by n-point crossover. Thus, there is some flexibility in how many different children are formed by a single n-point cross-over.

Sequence-Based Crossover—FIGS. 7–10

Figure 7:
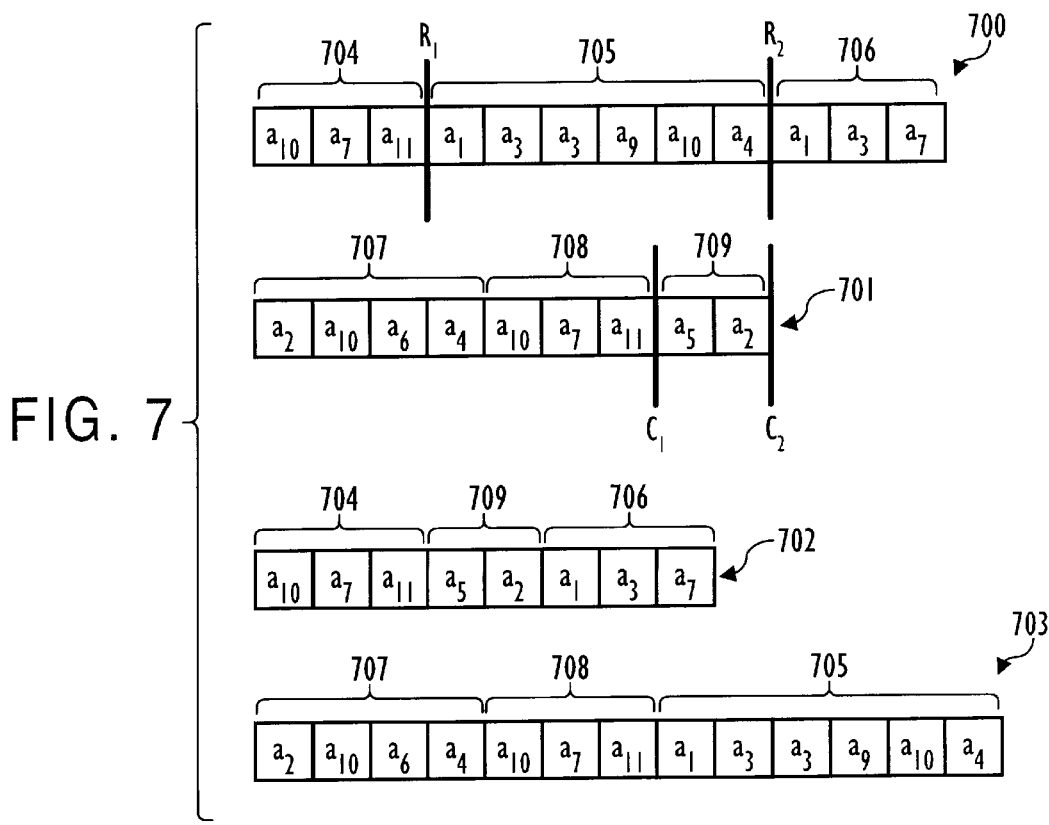
FIG. 7 is a schematic representation of chromosomes to which a first type of sequence-based cross-over is applied.
Figure 8:
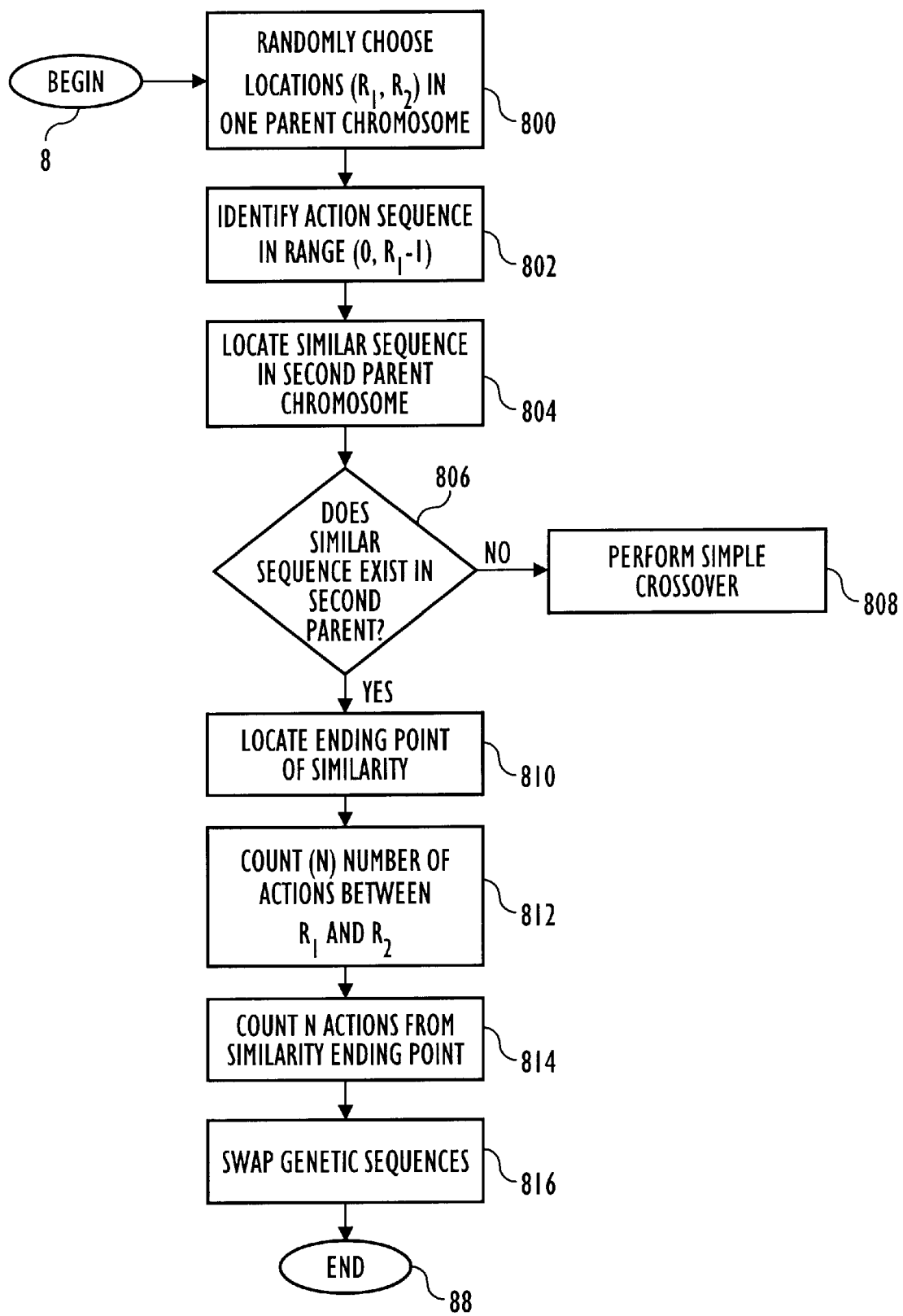
FIG. 8 is flow chart illustrating the process steps of a first type of sequence-based cross-over.

A first type of sequence based cross-over is described with respect to FIGS. 7–8. A second type of sequence-based cross-over is described with respect to FIGS. 9–10. FIG. 7 illustrates a schematic view of a parent pair of chromosomes 700–701 and the resulting children chromosomes 702–703 after a sequence-based crossover mating between the parents. FIG. 8 illustrates a flow diagram of the process of modified sequence crossover between a pair of parent chromosomes. Chromosomes 700 and 701 are a parent pair selected as described with respect to step 408 of FIG. 4. Chromosomes 702–703 are the children chromosomes resulting after a sequence-based crossover of parent chromosomes 700–701. Chromosome 700 is comprised of sequences 704–706. Chromosome 701 is comprised of sequences 707–709. The end result of the modified sequence crossover of parent chromosomes 700–701 is that sequence 705 of chromosome 700 is swapped with sequence 709 of chromosome 701. Therefore child chromosome 702 is comprised of sequences 704, 709 and 706 and child chromosome 703 is comprised of sequences 707, 708 and 705. The method by which the modified sequence crossover is accomplished by the genetic testing engine is described with respect to FIGS. 7 and 8.

FIG. 8 is a flow chart illustrating the steps by which the genetic testing engine performs a modified sequence crossover on a parent pair of chromosomes. Processing begins with element 8 and continues to step 800. During step 800, two cross-over points $R_1$, $R_2$ are randomly selected in one of the parent chromosomes (Parent A). In the example of FIG. 7 locations $R_1$ and $R_2$ are noted on parent chromosome 700. Processing next proceeds to step 802.

During step 802 the sequence of actions in the range (0, $R_1$–1) is identified where 0 is the first action in the Parent A chromosome. In the example of FIG. 7, the sequence identified by the operation of step 802 is sequence 704. Processing continues with step 804.

During step 804 the genetic testing engine searches the second parent chromosome (Parent B) for a sequence of actions the same as the sequence identified in Parent A by the operation of step 802. Using the example of FIG. 7, sequence 704 (range (0, $R_1$–1)) is identified by the operation of step 802. The same sequence of three actions appears as sequence 708 in parent chromosome 701.

Decision block 806 operates to determine if a similar sequence was found in the second parent chromosome. If not, processing continues to step 808 where simple crossover, or another type of cross-over, is performed as described with respect to FIGS. 5 and 6. If a similar sequence was found, as in the case of the example of FIG. 7, processing continues to step 810.

During step 810 the ending point of the similar sequence in the second parent chromosome is identified. This point is identified in chromosome 701 of FIG. 7 as cross-over point $C_1$. Processing proceeds to step 812.

Processing step 812 operates to count the number actions between cross-over points $R_1$ and $R_2$–1 of the first parent chromosome. Referring to FIG. 7, there are six actions from $R_1$ to $R_2$–1 thus the count N is 6. Processing continues to step 814.

During step 814 the genetic testing engine counts N actions after the first cross-over point $C_1$ to identify the end point (cross-over point $C_2$) of the genetic swap material for Parent B. In the case of the example of FIG. 7, there are only two actions following cross-over point $C_1$ in parent chromosome 701 (Parent B). In this situation the genetic testing engine counts N actions or to the end of the chromosome and marks the Nth action or the last action, as appropriate, as the end of the genetic swap material. This point in parent chromosome 701 is marked as cross-over point $C_2$. The genetic testing engine has thus identified the genetic material to be swapped or crossed-over between parent chromosome pair 700–701 to produce children chromosomes. The sequence to be crossed-over in chromosome 700 is sequence 705 and the sequence to be crossed-over in chromosome 701 is sequence 709. Processing then proceeds to step 816.

During processing step 816 the genetic swap occurs thus producing the children chromosomes. The identified swap sequence in Parent A, range ($R_1$, $R_2$–1), is exchanged with the identified swap sequence in Parent B, range ($C_1$, $C_2$–1). Using the example of FIG. 7, child chromosome 702 is comprised of sequence 704 from parent chromosome 700, sequence 709 from parent chromosome 701, and sequence 706 from parent chromosome 700. Likewise, child chromosome 703 is comprised of sequences 707–708 from parent chromosome 701, and sequence 705 from parent chromosome 700. Processing concludes with element 88.

The result of steps 800–816 is two children chromosomes who are more likely to have preserved some of the genetic ordering of their parent chromosomes than in the case of a simple crossover as described with respect to FIGS. 5–6.

Figure 9:
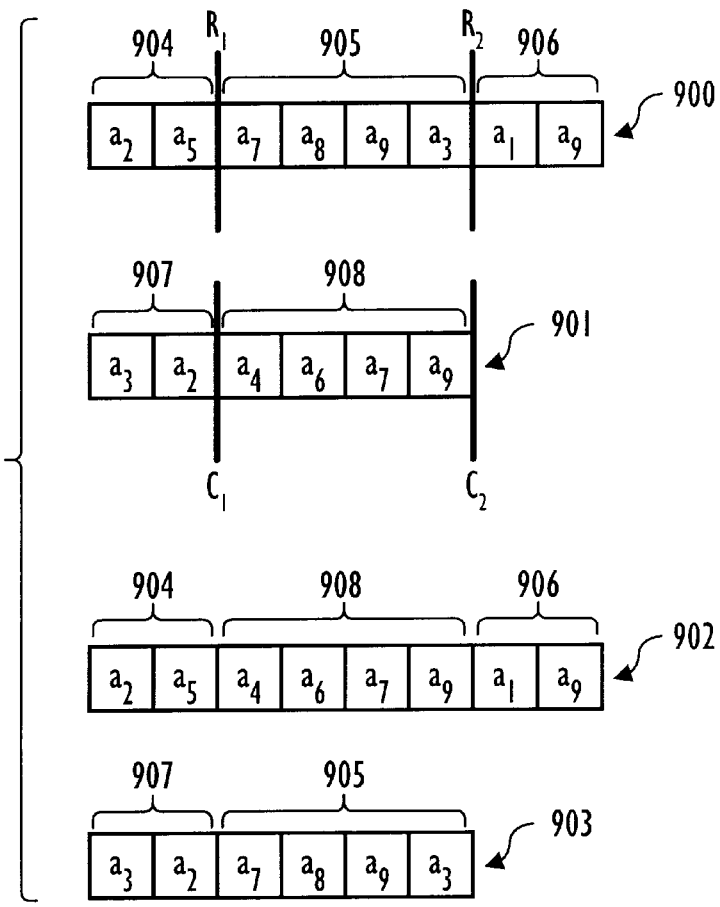
FIG. 9 is a schematic representation of chromosomes to which a second type of sequence-based cross-over is applied.
Figure 10:
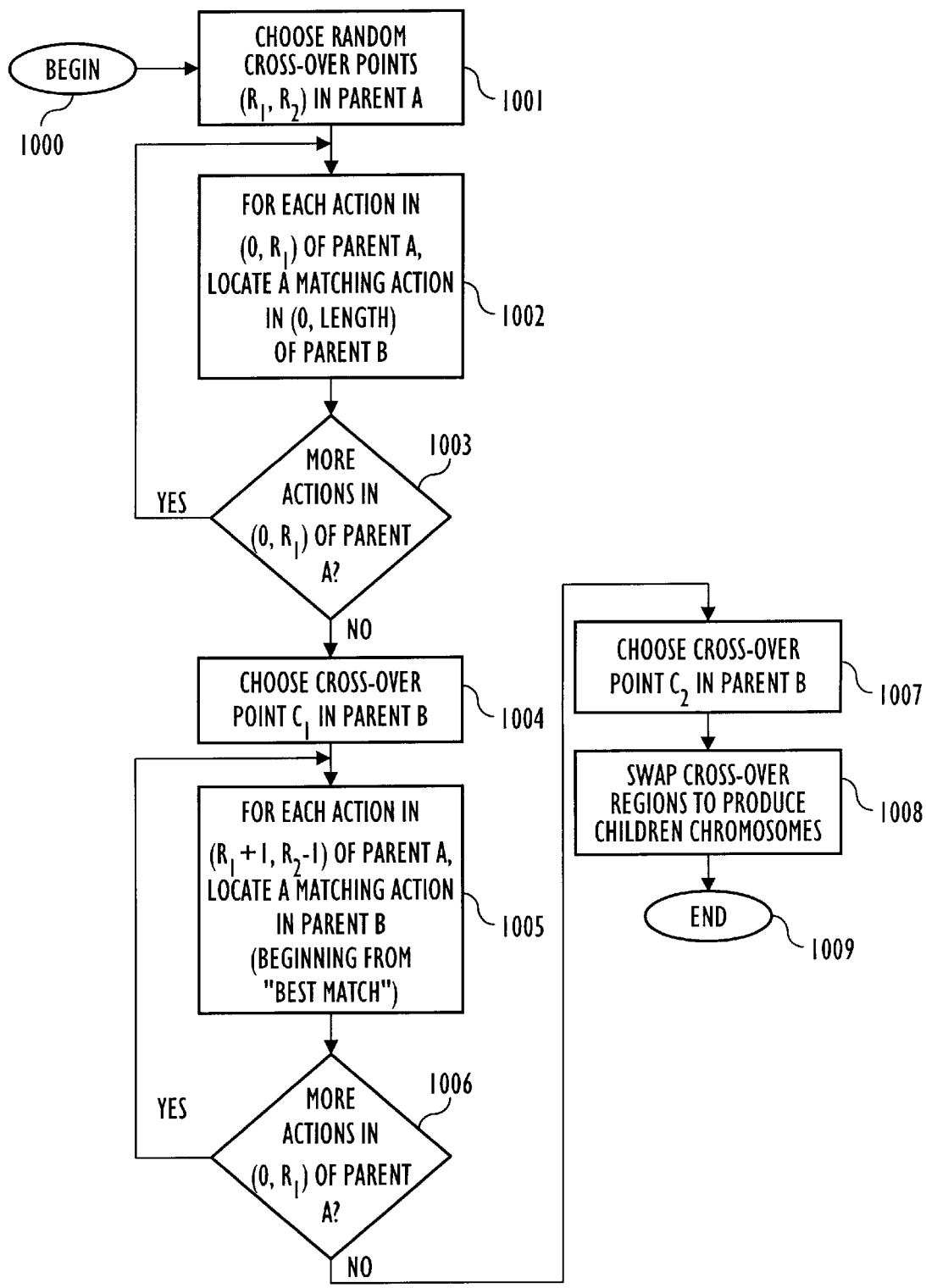
FIG. 10 is flow chart illustrating the process steps of a second type of sequence-based cross-over.

An alternative sequence-based cross-over method is described with respect to FIGS. 9–10. FIG. 9 illustrates a schematic view of a parent pair of chromosomes 900–901 and the resulting children chromosomes 902–903 after the alternative sequence-based crossover-type of mating between the parents. FIG. 10 illustrates a flow diagram of the process of the alternative sequence-based crossover between a pair of parent chromosomes. Chromosomes 900 and 901 are a parent pair selected as described with respect to step 408 of FIG. 4. Chromosomes 902–903 are the children chromosomes resulting after the alternative sequence-based crossover of parent chromosomes 900–901. Chromosome 900 is comprised of sequences 904–906. Chromosome 901 is comprised of sequences 907–908. The end result of the crossover of parent chromosomes 900–901 is that sequence 905 of chromosome 900 is swapped with sequence 908 of chromosome 901. Therefore child chromosome 902 is comprised of sequences 904, 908 and 906 and child chromosome 903 is comprised of sequences 907 and 905. Although the alternative sequence-based cross-over method of FIG. 9 appears similar to the sequence-based cross-over of FIGS. 7–8, the two methods differ as is apparent from a description of FIG. 10.

The flowchart of FIG. 10 begins with element 1000. At element 1000, two parent chromosomes, Parent A and Parent B, have been selected as described with respect to step 408 of FIG. 4. Processing proceeds to step 1001.

During step 1001, random cross-over points $R_1$ and $R_2$ are selected in Parent A. The actions comprising parent chromosomes A and B are identified with respect to the cross-over points. For example, there is a range of actions that begins with the first action in Parent A and ends with the action prior to random cross-over point $R_1$, i.e. Range (0, $R_1$–1). The range ($R_1$, $R_2$–1) is the portion of Parent A that is crossed over or swapped, as described below, to produce children chromosomes. Processing proceeds from step 1001 to step 1002.

Step 1002 and decision block 1003 cooperate to iterate over each action in the range (0, $R_1$–1) of Parent A to find matching actions in Parent B. With reference to FIG. 9, at location Parent A[0] is an $a_2$ action. Processing step 1002 operates to find a matching $a_2$ action in Parent B. A match is found at Parent B[1]. The next time step 1002 is processed, the search for matching actions in Parent B begins at the location just after the location of the last match (Parent B[2]). Processing then proceeds to decision block 1003. Decision block 1003 returns processing to step 1002 as long as there are more actions to match in the range (0, $R_1$–1). In the example of FIG. 9, there is one more action in the range (0, $R_1$–1) so processing is returned to step 1002. The next action in the range (0, $R_1$–1) is an $a_5$ action. Beginning at location Parent B[2], Parent B is searched for a match for action $a_5$. There is no match for action $a_5$ in the range (2, length) of Parent B. When Parent B has been searched for a match to each action in the range (0, $R_1$–1) of Parent A, processing proceeds to step 1004.

During step 1004 cross-over point $C_1$ in Parent B is determined. Cross-over point $C_1$ is located at the next action after the final match from range (0, $R_1$–1). Thus the next action after the last match found by operation of step 1002 is the location of cross-over point $C_1$. In the example of the chromosomes of FIG. 9, action $a_2$ at the Location Parent B[2] is the last match found by operation of step 1002. Therefore the location B[3] (action $a_4$) is the location of cross-over point $C_1$ of Parent B. Processing proceeds from step 1004 to step 1005.

Step 1005 and decision block 1006 cooperate to iterate over each action in the range ($R_1$, $R_2$–1) of Parent A to find matching actions in Parent B. The range of Parent B actions searched during step 1005 is range ($C_1$, length). Again using the example of FIG. 9, the first action in the range ($R_1$, $R_2$–1) is $a_7$. Step 1005 begins at cross-over point $C_1$ looking at an $a_4$ action and an $a_6$ action before finding an $a_7$ action at location B[4]. Processing then passes to decision block 1006 which returns processing to step 1005. The next action in the range ($R_1$, $R_2$–1) of Parent A is an $a_8$ action. Step 1005 operates, beginning at the action located just after the last match found by operation of step 1005, to locate an $a_8$ action in Parent B. Thus the range searched in Parent B is range (5, length). There is no $a_8$ action in this range of Parent B. Step 1005 and decision block 1006 iterate in this fashion through all actions in the range ($R_1$, $R_2$–1) of Parent A. The last matching action found by this process is an $a_9$ action at location B[5] of Parent B. When all the actions in the range ($R_1$, $R_2$–1) have been searched, processing proceeds from decision block 1006 to step 1007.

During step 1007 cross-over point $C_2$ in Parent B is determined. Cross-over point $C_2$ is located at the next action after the final match from range ($R_1$, $R_2$–1). Thus the last action found by operation of step 1005 precedes the location of cross-over point $C_2$ by one action. In the example of the chromosomes of FIG. 9, action $a_9$ at the location Parent B[5] is the last match found by operation of step 1005. Therefore cross-over point $C_2$ of Parent B is the next action after the $a_9$ action at Parent B[5]. Processing proceeds from step 1007 to step 1008.

During step 1008 the children chromosomes are produced. A first child chromosome is produced by taking the Parent A chromosome and replacing the actions of Parent A in the range ($R_1$,$R_2$–1) with the actions of Parent B from the range ($C_1$, $C_2$–1). A second child chromosome is produced by taking the Parent B chromosome and replacing the actions of Parent B in the range ($C_1$, $C_2$–1) with the actions of Parent A from the range ($R_1$,$R_2$–1). With reference to the example of FIG. 9, child chromosome 902 is comprised of chromosome segments 904 and 906 of parent 900 and segment 908 (from the range ($C_1$, $C_2$–1) of parent 901). Child chromosome 903 is comprised of segment 907 of parent 901 and segment 905 (from the range ($R_1,R_2$–1) of parent 900). Two children 902–903 are thereby produced while preserving some of the ordering information of the parents. Processing concludes with step 1009.

Delta-Based Crossover—FIGS. 16–21

Figure 21:
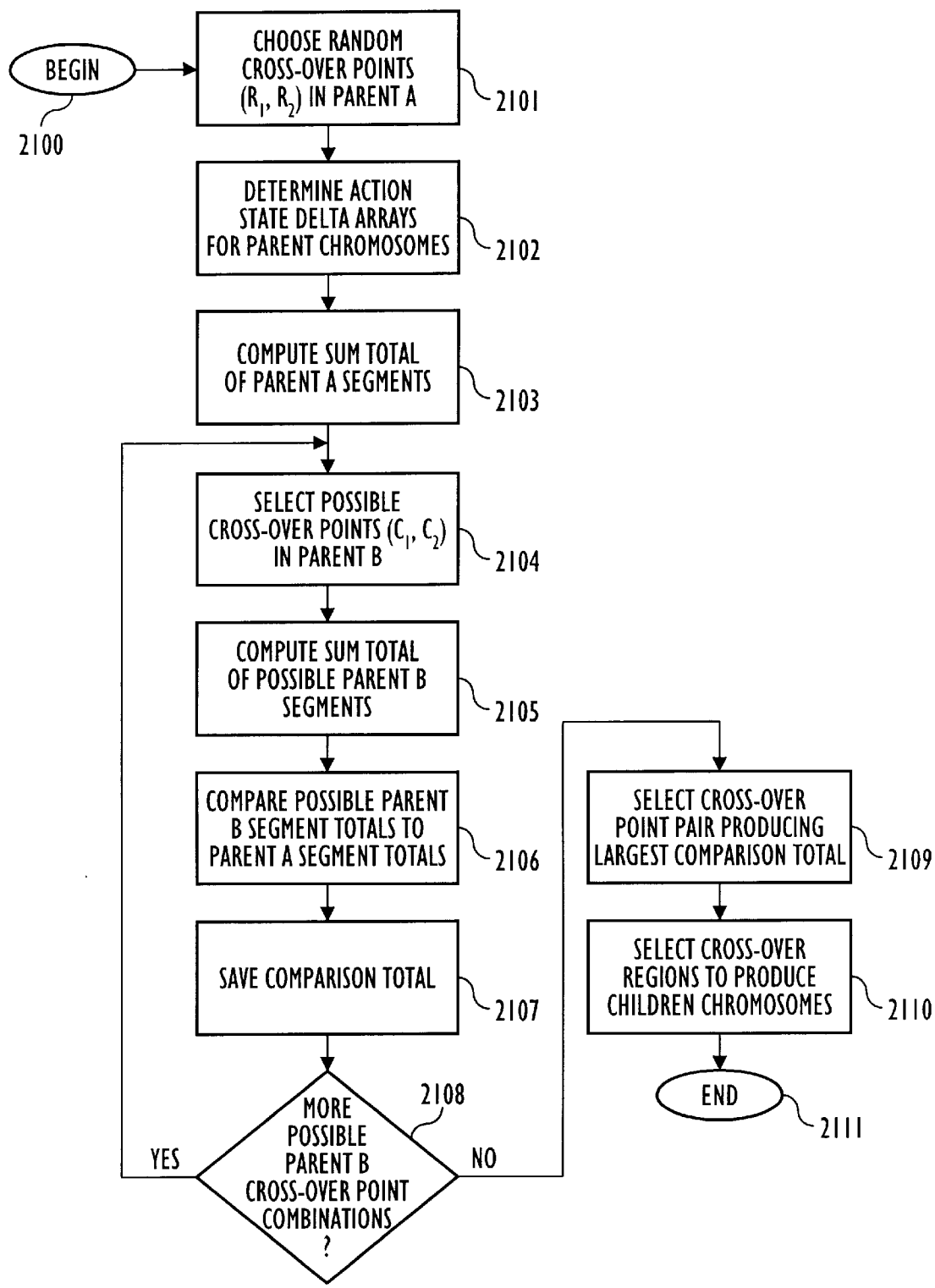
FIG. 21 is a flow chart illustrating the processing steps of a delta-based cross-over technique.

Whereas sequence-based cross-over methods analyze the order of actions present in each parent chromosome, delta-based cross-over methods analyze the property changes that actions in parent chromosomes produce in the target software system. FIG. 16 illustrates a schematic view of a parent pair of chromosomes 1600–1601 and the resulting children chromosomes 1602–1603 after a delta-based crossover between the parents. The composition of parent chromosomes 1600–1601 is identical to parent chromosomes 900–901 discussed with respect to one approach of sequence-based cross-over. FIGS. 17–20 illustrate various property delta vectors that are used, as described below, to determine the parent chromosome cross-over points and subsequently the composition of children chromosomes 1602–1603. FIG. 21 is a flow chart illustrating the steps of delta-based cross-over. FIGS. 16–20 are described with respect to the processing steps of FIG. 21.

The process steps of FIG. 21 begin with element 2100. At element 2100, two parent chromosomes, Parent A and Parent B, have been selected as described with respect to step 408 of FIG. 4. With reference to FIG. 16, chromosome 1600 is Parent A and chromosome 1601 is Parent B. Processing proceeds to step 2101.

During step 2101, random cross-over points $R_1$ and $R_2$ are selected in Parent A. The actions comprising parent chromosomes A are identified with respect to cross-over points $R_1$ and $R_2$. For example, there is a range of actions that begins with the first action in Parent A and ends with the location preceding random cross-over point $R_1$, i.e. Range (0, $R_1$–1). Range (0, $R_1$–1) is noted as segment 1604 on FIG. 16. The range ($R_1$, $R_2$–1) is the portion of Parent A that is crossed over or swapped to produce children chromosomes. This segment is noted as segment 1605 on FIG. 16. Processing proceeds from step 2101 to step 2102.

During step 2102 the action state delta arrays for the parent chromosomes are determined. FIG. 17 illustrates the action state delta arrays 1700–1701 for parent chromosomes 1600–1601, respectively. Each row 1702–1709 and 1710–1715 of action state delta arrays 1700–1701 represents the action state deltas for properties $p_1$–$p_7$ resulting from application of the actions comprising the parent chromosomes to the target software system. Each row of action state delta arrays 1700–1701 is similar in structure to Table 4. Action state delta arrays 1700–1701 simply contain information regarding multiple actions and multiple properties. Processing proceeds from step 2102 to step 2103.

Figures 18, 19, 20:
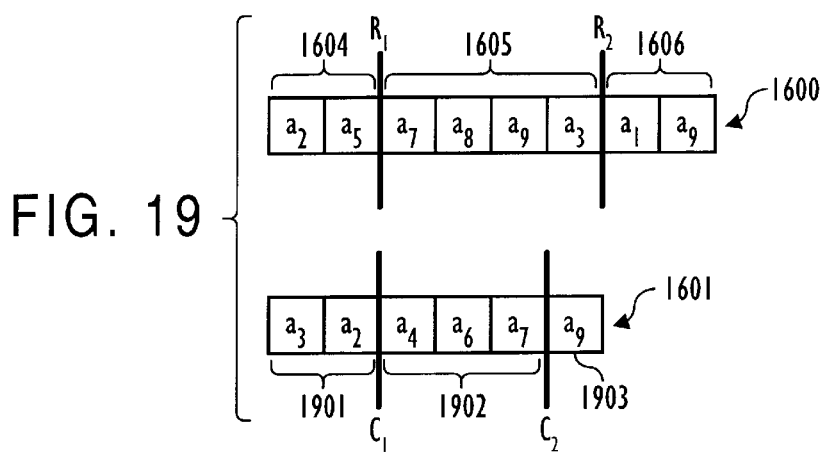

During step 2103, the sum total of the action state deltas for each segment or sub-sequence of the Parent A chromosome is determined. FIG. 18 illustrates the sum total property deltas for the three segments of chromosome 1600 of FIG. 6. Rows 1800–1802 show the sum total property deltas for segments 1604–1606, respectively, of chromosome 1600. Segment 1604 is examined by way of example to explain the sum total property deltas of FIG. 18. Segment 1604 is comprised of action sequence $a_2,a_5$. With reference to FIG. 17, action $a_2$ causes a +1 delta in property $p_1$ while action $a_5$ causes no change in property $p_1$. Thus the sum total of the effect of the sequence $a_2,a_5$ is a +1 change in property $p_1$. This is reflected in the $p_1$ column of row 1800 of FIG. 18. Each sum total property delta value in FIG. 18 is computed in similar fashion to that described for property $p_1$ and segment 1604. Processing proceeds from step 2103 to step 2104.

A process of computing sum total property deltas for the parent chromosome segments, as described with respect to step 2103 for Parent A, is iterated over every possible combination of cross-over points for Parent B. This process begins with step 2104 where a pair of possible cross-over points $C_1,C_2$ are chosen for Parent B. Steps 2104–2108 are repeated until each possible combination of possible cross-over points for Parent B have been analyzed. Say a first set of cross-over points ($C_1$, $C_2$) are selected during step 2104. The first cross-over points ($C_1$, $C_2$) selected during step 2104 are shown in FIG. 19. FIG. 19 depicts the same parent chromosomes 1600–1601 from FIG. 16 with the exception that cross-over points $C_1$, $C_2$ are in different positions from those of FIG. 16. The locations of cross-over points $C_1$, $C_2$ shown in FIG. 19 are one of the possible combinations of cross-over points locations for parent chromosome 1601 (Parent B). The placement of cross-over points $C_1$, $C_2$ shown in FIG. 19 defines three segments or sub-sequences 1901–1903 in chromosome 1601. Processing then proceeds to step 2105.

During step 2105, the sum total of the action state deltas for each segment or sub-sequence of the Parent B chromosome is determined. This is the same operation as was described with respect to step 2103 for the Parent A chromosome. FIG. 20 represents the action state delta sum array for the iteration of steps 2104–2108 where the cross-over points $C_1,C_2$ are in the position shown in FIG. 19. Rows 1800–1802 are the property value sum totals calculated for chromosome 1600 (Parent A) during step 2103. Rows 2001–2003 are the property value sum totals calculated for chromosome 1601 (Parent B) during step 2105. After calculating the property value sum totals for the chromosome segments of Parent B, processing continues to step 2106.

During step 2106 the property value sum total of each segment of Parent B is compared to the property value sum total of each corresponding segment of Parent A. Matching property values are evaluated as a plus (+) 1 and non-matching property values are evaluated as a minus (–) 1. FIG. 20 includes evaluation rows 2004–2006. As an example, sequence 1605 of chromosome 1600 (Parent A) has a property value sum total of +1 for property $p_2$. Sequence 1902 of chromosome 1601 (Parent B) has a property value sum total of –1 for the same property $p_2$. Thus evaluation row 2005 indicates an evaluation of –1 for property $p_2$. The evaluations for each property and for each sequence pair are summed to produce a comparison total. For example, evaluation row 2004 sums to +3, evaluation row 2005 sums to +3 and evaluation row 2006 sums to –1. The comparison total (3+3–1=5 for the example of FIGS. 19–20) is stored, during step 2107, as the final "score" of the comparison between Parent A and the present iteration of the cross-over points for Parent B. Processing proceeds from step 2107 to decision block 2108.

Decision block 2108 operates to return processing to step 2104 as long as there are further combinations of Parent B cross-over point locations over which to iterate. The comparison total is saved during step 2107 for each combination of Parent B cross-over point locations. Once every combination of cross-over points locations has been processed through steps 2104–2107, decision block 2108 operates to direct processing to step 2109.

During step 2109 the final cross-over point locations for Parent B are chosen by selecting the cross-over point combination that produced the largest comparison total. In the current example, the cross-over point locations shown in FIG. 16 for chromosome 1601 (Parent B) produced the largest comparison total (a comparison total of 7). Thus cross-over point $C_1$ and $C_2$ are located as shown in FIG. 16. Processing then continues to step 2110.

During step 2110 the children chromosomes are produced. A first child chromosome is produced by using the actions of Parent A and replacing the actions of Parent A in the range ($R_1,R_2$–1) with the actions of Parent B in the range ($C_1$, $C_2$–1). A second child chromosome is produced by using the actions of Parent B and replacing the actions of Parent B in the range ($C_1$, $C_2$–1) with the actions of Parent A in the range ($R_1,R_2$–1). With reference to the example of FIG. 16, child chromosome 1602 is comprised of chromosome segments 1604 and 1606 of parent 1600 and segment 1608 (from the range ($C_1$, $C_2$–1) of parent 1601). Child chromosome 1603 is comprised of segments 1607 and 1609 of parent 1601 and segment 1605 (from the range ($R_1,R_2$–1) of parent 1600). Two children 1602–1603 are thereby produced while preserving some of the ordering information of the parents. Processing concludes with step 2111.

Experience has shown that the delta-based cross-over method is more effective than sequence-based methods at producing useful children chromosomes, i.e. children chromosomes that produce "interesting" test cases. However, the delta-based method is more computationally intensive and requires more time to iterate through all the possible combinations of cross-over point locations in Parent B.

Altering Chromosomes With Mutagens—FIGS. 11–14

As noted with respect to step 412 of FIG. 4, the genetic testing engine applies mutagens to children chromosomes. Alternatively, mutagens can be applied directly to parent chromosomes rather than to children chromosomes.

Application of a mutagen to a chromosome alters the makeup of the chromosome. The use of mutagens supplements the mating step in the evolution of chromosomes. The genetic testing engine utilizes a variety of mutagens to alter the children chromosomes. One or more of the mutagens may be applied during step 412 of FIG. 4. The mutagens and their operation are discussed with respect to FIGS. 11–14.

Figure 11:
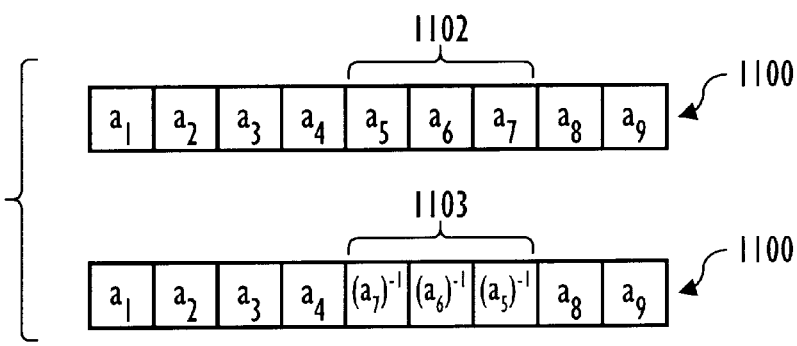
FIG. 11 is a is a schematic representation of chromosomes to which the Sequence Inversion mutagen is applied.

FIG. 11 illustrates the effect of the Sequence Inversion mutagen. Sequence Inversion operates by randomly selecting a sequence of actions within a child chromosome and replacing the selected sequence with its inverted sequence, if available. The inverted sequence of a selected sequence does the opposite or inverse of the selected sequence. If there are no corresponding inverted action(s), then those actions are either not inverted at all or they could also be removed from the determination of the inverted sequence entirely.

Chromosome 1100 is a child chromosome before application of the Sequence Inversion mutagen. Chromosome 1101 is the same child chromosome after application of the Sequence Inversion mutagen. Sequence 1102 is randomly selected from child chromosome 1100 for inversion. Table 8 indicates the actions applied to the target software system corresponding to action identifiers $a_5$, $a_6$ and $a_7$ of sequence 1102. Table 8 also indicates the inverse actions corresponding to each action of sequence 1102.

TABLE 8

| Action Identifier | Action: $a_x$ | Inverted Action: $(a_x)^{-1}$ |
|---|---|---|
| $a_5$ | <Right Arrow Key> | <Left Arrow Key> |
| $a_6$ | <'a'> | <Backspace> |
| $a_7$ | <Edit/Paste> | <Edit/Undo> |

As noted above, Sequence Inversion is just one of many possible mutagens.

"Combine" is a mutagen used by the system of the present invention to chain together optimal sequences of actions into a single "super action". The super action is then treated as an additional action which is used in future generations of chromosomes. An "optimal" sub-sequence of actions is one which has a relatively high fitness rating. For example, Table 9 lists four actions, $a_1$–$a_4$, out of hundreds of possible actions for a particular word-processing target system.

TABLE 9

| Action Identifier | Action: $a_x$ |
|---|---|
| $a_1$ | Edit/Select All |
| $a_2$ | Edit/Copy |
| $a_3$ | File/New |
| $a_4$ | Edit/Paste |
| $a_{50}$ | $a_1, a_2, a_3, a_4$ |

These four actions applied together in consecutive order perform the task of copying the contents of one document to a new document. The fitness criteria for this test case ($a_1$, $a_2$, $a_3$, $a_4$) results in a high fitness rating when this sequence of actions or chromosome is applied to the target system. The Combine mutagen operates to combine this sequence of actions into a single action, indicated as action $a_{50}$ in Table 8. Action $a_{50}$ is then inserted in a child chromosome thereby effectively moving an entire task to a different chromosome location. Combine allows the system to learn optimal tasks then more efficiently combine those tasks to perform increasingly complex yet efficient test cases.

Figure 12:
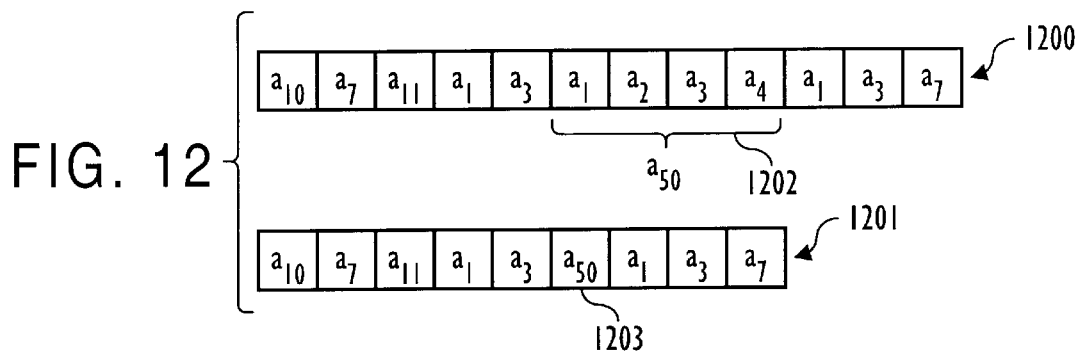
FIG. 12 is a is a schematic representation of chromosomes to which the Combine mutagen is applied.

FIG. 12 illustrates a child chromosome 1200 prior to operation of the Combine mutagen and a child chromosome 1201 after operation of the Combine mutagen. Chromosome 1200 is comprised of a sequence of actions including action 1202. The Combine mutagen is applied to child chromosome 1200 by replacing subsequence 1202 of chromosome 1200 with the super action $a_{50}$ discussed above with respect to Table 9. The result is child chromosome 1201 that has action 1203 (super action a50) in place of subsequence 1202. The combine mutagen effectively combines the "select all/copy/paste in a new document" sub-task into child chromosome 1200. This is one way by which the system of the present invention operates to discover high level tasks and effectively recombine these higher level tasks in order to arrive at increasingly complex test cases.

Figure 13:
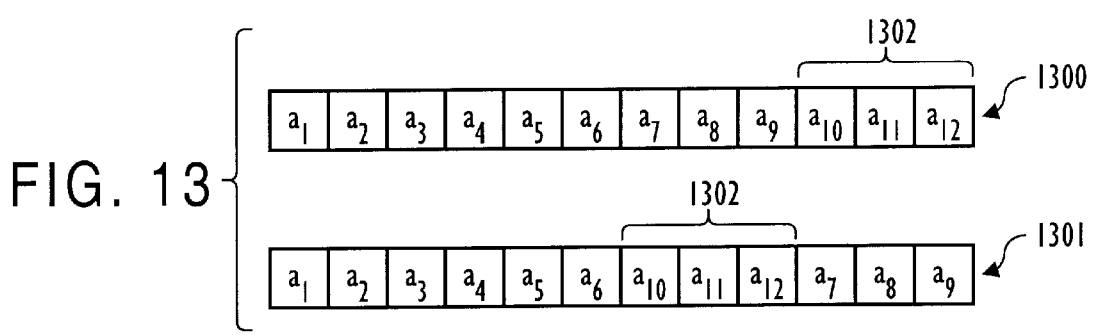
FIG. 13 is a is a schematic representation of chromosomes to which the Warp mutagen is applied.

Another mutagen unique to the present invention is referred to as "Warp". Warp operates to move a sub-sequence of actions within a chromosome to a different position within the chromosome. FIG. 13 is used to illustrate the operation of the Warp mutagen. Child chromosome 1300 illustrates a series of actions prior to application of the Warp mutagen. Child chromosome 1301 illustrates the chromosome after application of the Warp mutagen. Sub-sequence 1302 of chromosome 1300 is moved to a different location in chromosome 1301. The Warp mutagen is particularly useful for discovering defects and isolating defects that occur in a variety of dissimilar states.

Figure 14:
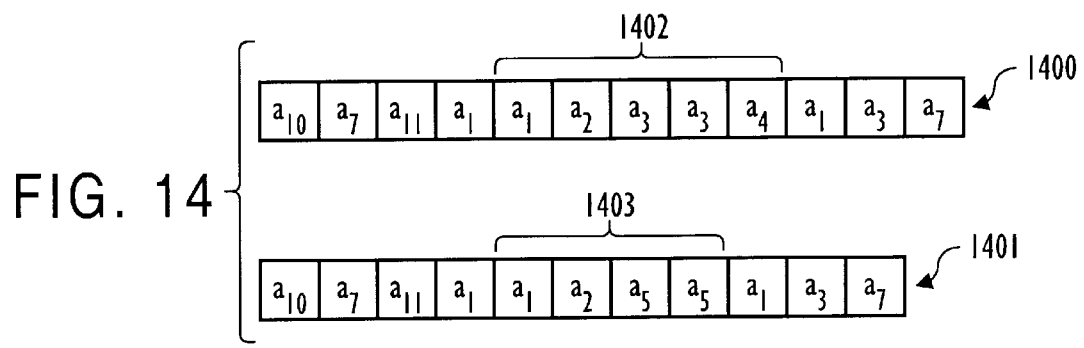
FIG. 14 is a is a schematic representation of chromosomes to which the Delta Sum Replace mutagen is applied.

FIG. 14 illustrates the operation of the "Delta Sum Replace" mutagen. Delta Sum Replace replaces a sub-sequence of actions with a different sequence of actions that cause the same change in the observed state of the target system. Some of the actions comprising child chromosome 1400 are defined below in Table 10.

TABLE 10

| ACTION | DESCRIPTION |
| --- | --- |
| $a_1$ | <'a'> |
| $a_2$ | <'b'> |
| $a_3$ | <Shift> + <Left Arrow Key> |
| $a_4$ | <Edit/Cut> |
| $a_5$ | <Backspace> |

Child chromosome 1400 includes a sub-sequence 1402. Sequence 1402 includes the actions $a_1$, $a_2$, $a_3$, $a_3$, $a_4$. These successive actions operate to type the letters 'a' and b' and then, by selecting the just-typed letters and cutting them, removes them from the document. Chromosome 1400 is altered by replacing sequence 1402 with sequence 1403. Chromosome 1401 is identical to chromosome 1400 but for the replacement of sequence 1402 in chromosome 1400 by sequence 1403 in chromosome 1401. Sequence 1403 produces the same change in state in the target system as sequence 1402. The successive actions, $a_1$, $a_2$, $a_5$ and $a_5$, operate to type the letters 'a' and 'b' and then, by deleting, removes them from the document. The Delta Sum Replace mutagen thereby results in chromosomes that are more likely to execute different ways of achieving similar effects in the target system as compared to other chromosomes. The mutagens and operators used in the system of the present invention are preferably applied according to a probability assigned by the user. For example, Table 11 illustrates the probabilities of certain mutagens being applied during a certain test run.

TABLE 11

| MUTAGEN | PROBABILITY |
| --- | --- |
| Sequence Inversion | 1.0% |
| Mutation | .05% |
| Warp | 2.5% |
| Combine | 0.5% |

Mutation is a simple and known genetic operator (mutagen) which forms a child chromosome by making (usually small) alterations to the values of actions in parent chromosome.

The system of the present invention can also be configured to apply a probability to the mating step. For example, if the probability of mating is 50% then mating (cross-over) is performed for only half the process generations and then the mutagens are applied according to their respective probabilities. In the case where mating is not performed, chromosomes are selected from the population and further processed as "children" chromosomes by applying mutagens according to the appropriate probabilities such as shown in Table 11.

Figure 15:
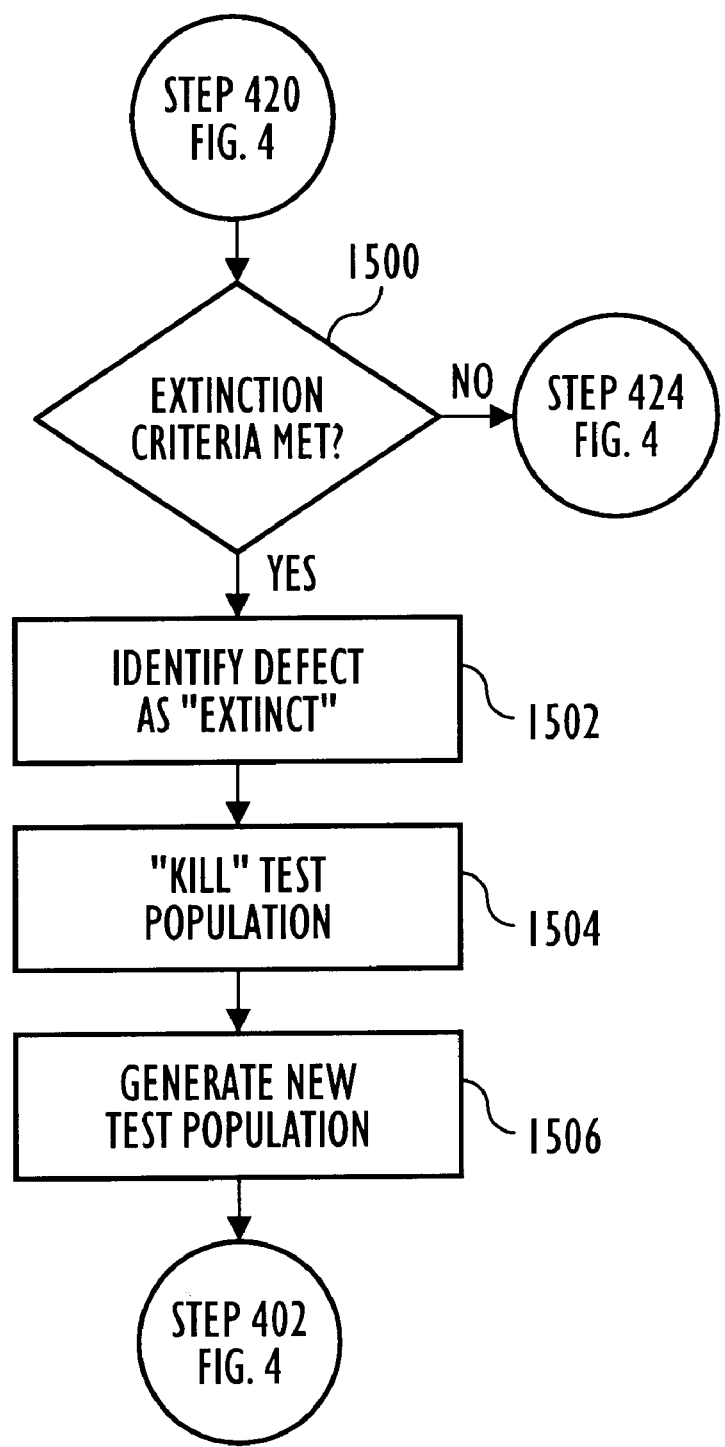
FIG. 15 is a flow chart of the Extinction process.

Test Chromosome Population Diversity—FIGS. 15

Without effective measures to ensure diversity in the test chromosome population, the software testing system of the present invention will target a defect and focus in on that defect until nearly all test cases it produces demonstrate the defect. This is not desirable behavior given that this undermines the objective of broad testing coverage of the target software system. The system of the present invention employs various techniques for ensuring diversity in the test chromosome population. One technique is "Extinction" as noted above with respect to step 422 of FIG. 4 and another technique is evolving the "noisy" population as noted above with respect to step 424 of FIG. 4.

FIG. 15 is a flow chart supporting a more detailed description of the operation of step 422 of FIG. 4. Processing of step 420 of FIG. 4 continues to step 1500 of FIG. 5. Step 420 of FIG. 4 operates to archive a defect-producing chromosome therefore steps 1500–1506 are performed each time a child chromosome is found to have produced a defect.

Decision block 1500 operates to determine if the extinction criteria have been met for the defect produced by the just-archived chromosome. The extinction criteria determine when a defect has been sufficiently explored by the system of the present invention. Any criteria can be used. One embodiment of the present invention uses the percentage of chromosomes in the test population that produce a given defect as the criteria for extinction. For example, if this threshold is set at 50%, then when more then 50% of the chromosomes in the test population produce a given defect the extinction criterion is met. Another example is the length of the defect-producing chromosome. An extinction criterion of an embodiment of the present invention is the number of actions in the defect producing chromosome. For example, if this threshold is set at 30 actions, then when a chromosome produces a given defect and that chromosome is comprised of less than 30 actions the extinction criterion is met. In a further embodiment of the present invention both the "percentage of the test population" and the "length of the defect-producing chromosome" criteria are used as the extinction criteria. When a certain percentage of the test population chromosomes produce a given defect and the defect has been minimized to a defect-producing chromosome of less than a certain number of actions, the extinction criteria are met. In a still further embodiment, the extinction criteria are tied to the overall improvement of the population over a specified number of generations. For example, if greater than 75% of the population demonstrate the defect and the length of the shortest defect-demonstrating chromosome has not changed for 5 generations then the extinction criteria is met. If decision block 1500 determines that the extinction criteria are met then processing proceeds to step 1502 else processing returns to step 424 of FIG. 4 to continue the evolution of the test population.

During step 1502 the defect, for which the extinction criteria has been met, is identified as extinct. The effect of this is to alter the fitness rating associated with chromosomes that produce the particular defect. Before any defects have been identified as extinct all defect-producing chromosomes are given relatively high fitness ratings. Step 1502 operates to amend the fitness ratings so that a chromosome that produces an extinct defect will be given a relatively low fitness ratings. This means that the evolution process will ensure that this chromosome is not likely to be featured in future generations. Processing then proceeds to step 1504.

Process step 1504 operates to 'kill' the test population. All the chromosomes or test cases comprising the test population are removed from the test population thereby effectively restarting the testing process. The test population is killed because the chromosomes comprising the test population are largely the result of identifying and minimizing a now extinct defect. An alternative is to kill only the chromosomes that produce the extinct defect. Processing then proceeds to step 1506.

During process step 1506 a new initial test population is generated. As for the first generation of chromosomes, the initial test population can be generated randomly. Another method, however, is to generate the new initial test population by using chromosomes from the noisy archive. Chromosomes in the noisy archive are more evolved than randomly generated chromosomes and will more quickly lead to interesting, i.e., high fitness, test cases. Once a new initial test population is generated, processing returns to step 402 of FIG. 4 which begins anew the evolution process for the new test population.

The noisy chromosome population is also used to maintain diversity in the evolution of test cases. The noisy archive is populated with chromosomes, as discussed with respect to step 416 of FIG. 4, having lower fitness ratings. The noisy population is separately evolved using a process substantially similar to steps 408–414 described with respect to FIG. 4. The separate evolution of the noisy population maintains a diverse, with respect to the test population, genetic pool from which to draw chromosomes. As in biological evolution, the introduction of noise into the genetic makeup of a population helps to produce a more robust and flexible population. The noisy chromosomes are used in various ways to inject noise into the test population. As described with respect to FIG. 15, the noisy population is used to replenish the test population after a defect has been determined extinct. Also, chromosomes from the noisy population can occasionally be selected as one half of a parent pair for mating as discussed with respect to FIGS. 4 and 7. Noisy chromosomes or portions of noisy chromosomes can also be used by the mutagens described with respect to FIGS. 11–14. Although step 424 of FIG. 4 is indicated as a serial step in the evolution of the test population, those skilled in the art recognize that the noisy population can be processed in parallel fashion completely independent from the test population.

Figure 23:
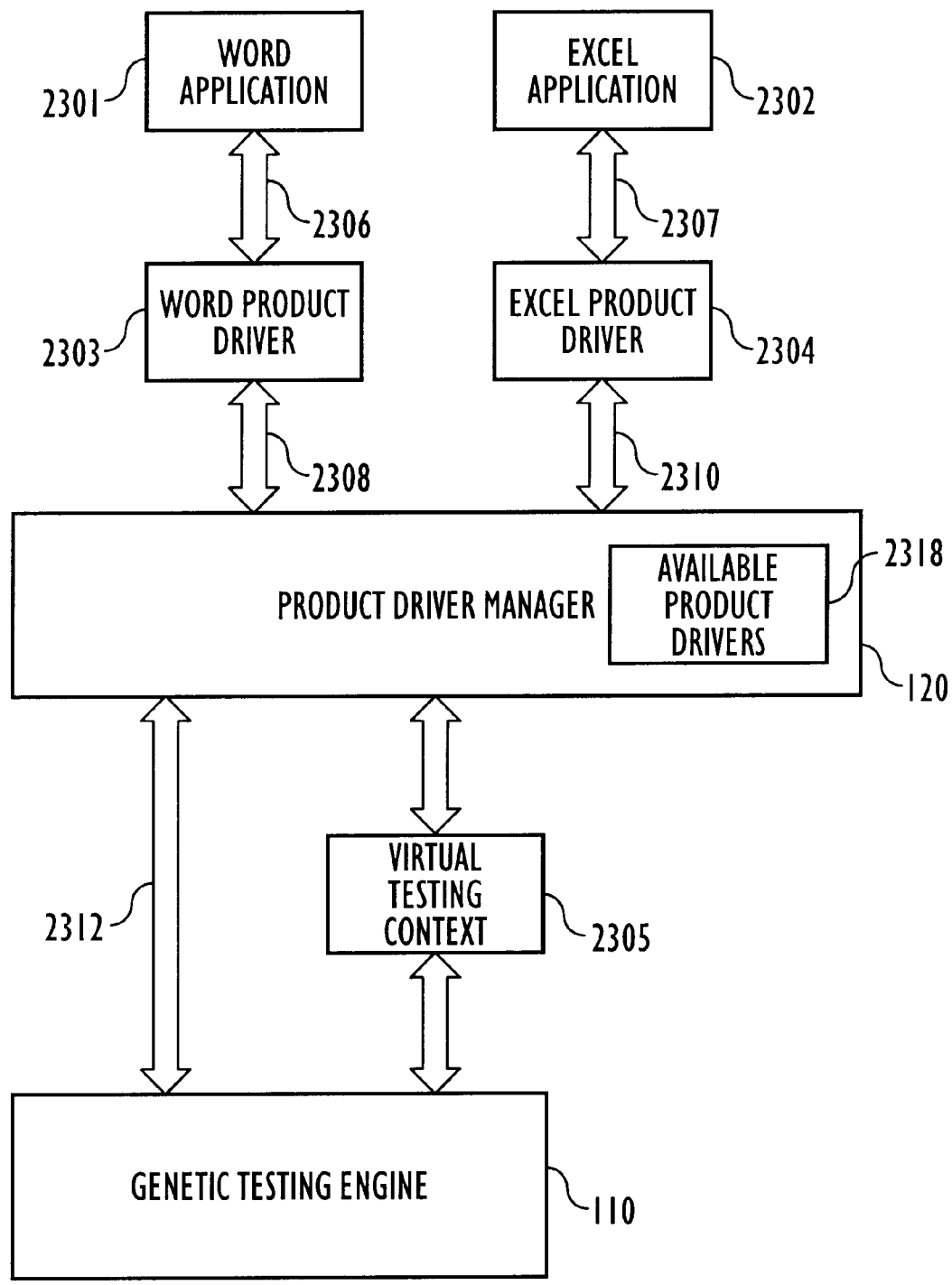
FIG. 23 is a more detailed block diagram illustrating the major components of the software testing system of the present invention.

Product Driver Manager and Product Drivers—FIGS. 23

FIG. 23 is a slightly more detailed version of FIG. 1 in which is shown the overall components and communication paths between components of the testing system of the present invention. Communications between the genetic testing engine 110 and the Product Driver Manager ("PDM") 120 and between the PDM 120 and the target software systems are described with respect to FIG. 23.

In one embodiment of the present invention, the various components of the inventive system such as genetic testing engine 110 and PDM 120 are organized and communicate according to the Object Linking and Embedding Component Object Model ("OLE COM"). Those skilled in the art recognize the conventions of OLE COM and OLE COM itself does not form part of the present invention.

FIG. 23 is described within the context of an example where a Word application 2301 is the primary system under test. The user also wants to be able to handle interactions with the Excel application 2302 if they arise. The operation of PDM 120 is described in two categories, configuration and run-time product driver management.

The first responsibility of PDM 120 is configuration. A list of available product drivers 2318 is maintained by PDM 120. The available product drivers list 2318 includes information about each product driver such as the location(path) of the driver, what target software systems the driver should be used for, and whether or not the driver is currently loaded in memory. Although list 2318 is depicted in FIG. 23 as being part of PDM 120, its actual location or form is not important to the present invention. It is only important that this information, in the form of a list or database or otherwise, be available to PDM 120. Alternatively, PDM 120 could expose a set of Application Program Interfaces ("API's") for easily installing, un-installing and listing drivers. When a test of a target software system is initiated, PDM 120 operates to install the necessary product driver(s) to prepare the testing system for operation.

The second responsibility of PDM 120 is the run-time management of the product drivers. Using the example of FIG. 23, PDM 120 manages the interactions between testing engine 110 and applications 2301–2302. This is accomplished as described below by providing to the testing engine a virtual interface to the active target software system.

At the start of a test of the Word application 2301, genetic testing engine 110 asks PDM 120 over interface 2312 for an interface for Word through which testing engine 110 can communicate with Word application 2301. PDM 120 responds by first loading the product driver for Word application 2301 using the configuration process described above. PDM 120 then obtains an interface 2308 (IProductDriver) to the newly installed Word product driver 2303. PDM 120 obtains the IProductDriver interface by calling the exposed CreateProductDriver() function at the Word product driver 2303. The IProductDriver interface is the interface by which PDM 120 and Word product driver 2303 communicate. Each product driver supports the CreateProductDriver() function. PDM 120 then uses the IProductDriver interface 2308 to obtain an IContext interface 2306 for the running instance of Word application 2301. The IContext interface 2306 is the interface by which PDM 120 communicates (applies actions, receives properties) with Word application 2301. PDM 120 takes the IContext interface 2306 and keeps it as the "active" software system interface. Each IContext interface supports at least GetProperty() and DoAction() methods for applying actions to and receiving properties from the software system under test.

This process began with genetic testing engine 110 requesting an interface for Word application 2301. PDM 120 now has this interface (IContext interface 2306) but does not simply hand the interface back to genetic testing engine 110. Ideally, as far as testing engine 110 is concerned, it is testing a single target system. Were it to use the IContext interface 2306 obtained by PDM 120 for Word application 2301, testing engine 110 would have to deal with the switches between active target software systems. For example, when the "active" target system switches from Word to Excel. The implementation of genetic testing engine 110 is kept relatively generic by wrapping the IContext interface 2306 in IVirtualContext interface 2305. IVirtualContext interface 2305 belongs to PDM 120 and provides for communications between genetic testing engine 110 and Word application 2301 by passing calls by testing engine 110 through to the IContext interface 2306. Testing engine 110 uses IVirtualContext interface 2305 for applying actions to and retrieving properties from the target software system (Word). If the active software system changes during the testing process, i.e., a switch from Word to Excel, PDM 120 recognizes the change by monitoring the active window. PDM 120 then queries the list of available product drivers 2318 for a product driver that matches the newly active software system. When it finds the appropriate driver, PDM 120 loads the new driver e.g. Excel product driver 2304. PDM 120 then calls the CreateProductDriver() function to get the IProductDriver interface 2310 for the new product driver 2304. PDM 120 then calls a function at IProductDriver interface 2310 to get a new IContext interface 2307 for the newly active software system. PDM 120 then replaces the old (Word) IContext interface 2306 wrapped by IVirtualContext interface 2305 with the new (Excel) IContext interface 2307 and informs testing engine 110 of the change.

The above-described interaction between the genetic testing engine, the product driver manager, product drivers and target software systems allows the testing engine to focus solely on generating test cases (actions) and measuring the results of those test cases (properties). Those skilled in the art recognize that there are other architecture designs that also exploit the advantages of the actions/properties model of the target software system.

Parallel Genetic Testing Engines—FIG. 24

FIG. 24 illustrates in block diagram form an application of the present invention utilizing multiple genetic testing engines to test a common target software system(s). Genetic testing engines 2400–2401 share a common defect archive 2402. Each time one of genetic testing engines 2400–2401 identifies a defect the defective chromosome is stored in defect archive 2402. Genetic testing engine 2401 represents any number of additional genetic testing engines. The multiple genetic testing engines 2400–2401 each test a different instance of the same target software system. Thus target systems 2403–2404 are different instances of the same target software system. Several advantages are available in a system utilizing multiple genetic testing engines. One example is that multiple genetic testing engines testing the same target software system can more quickly locate defects. Another example is when a certain defect population has been accumulated in defect archive 2402 by operation of genetic testing engines 2400–2401, genetic testing engine 2401 can cease evolving its population of chromosomes and instead begin minimizing the defect population of defect archive 2402. In this fashion, genetic testing engine 2400 continues to evolve its chromosome population while genetic testing engine 2401 minimizes known defects.

It is to be expressly understood that the claimed invention is not to be limited to the description of the above embodiments but encompasses other modifications and alterations within the scope and spirit of the inventive concept.

We claim:

1. A method for adaptively solving a sequential problem in a target system comprising the steps of:

producing a population of chromosomes of varied length where each chromosome is formed of a plurality of actions each of said actions representing a stimulus applicable to said target system;

applying said population of chromosomes to said target system;

measuring characteristics of said target system, responsive to application of each of said chromosomes, and said characteristics being definitive of a state of said target systems;

determining, responsive to measurement of said characteristics, a fitness rating for each of said chromosomes comprising said population of chromosomes; removing said chromosomes having the lowest fitness rating to a noisy archive; and evolving said population of chromosomes to produce a child chromosome wherein said child chromosome is a solution to said sequential problem.

2. The method of claim 1 wherein said producing step includes:

assigning an action designation to individual stimuli receivable by said target system; and randomly combining a plurality of said actions to form a chromosome.

3. The method of claim 1 wherein said applying step includes:

exercising said target system with ones of said chromosomes one at a time until said target system has been exercised with all of said population of chromosomes.

4. The method of claim 3 wherein said exercising step includes:

inputting a sequence of actions constituting one of said chromosomes one at a time to said target system until all of said actions constituting said chromosome have been input to said target system.

5. The method of claim 1 where said measuring step further includes:

measuring defects of said target system wherein ones of said actions or ones of said chromosomes cause said defects in said target system.

6. The method of claim 1 wherein said determining step includes:

calculating said fitness rating for each of said chromosomes wherein each of said fitness ratings is a function of said property changes attributable to one of said chromosomes and a length of said one of said chromosomes.

7. The method of claim 1 wherein said determining step includes:

calculating said fitness rating for each of said chromosomes wherein each of said fitness ratings is a function of said property changes attributable to one of said chromosomes, a length of said one of said chromosomes and any defects attributable to said one of said chromosomes.

8. The method of claim 7 wherein said determining step includes:

measuring properties of said target system to determine property changes brought about by application of each action comprising each child chromosome;

measuring defects of said target system wherein ones of said actions or ones of said child chromosomes cause said defects in said target system; and calculating said fitness rating for each of said chromosomes wherein each of said fitness ratings is a function of said property changes attributable to one of said child chromosomes, a length of said one child chromosome and any defects attributable to said one child chromosomes.

9. The method of claim 1 wherein said evolving step includes:

selecting a parent chromosome from said chromosome population;

mutating said parent chromosome to form a child chromosome wherein said child chromosome differs from said parent chromosome;

determining fitness of said child chromosome; and inserting child chromosome into said chromosome population.

10. The method of claim 9 wherein said mutating step includes:

mating said parent chromosomes to produce children chromosomes.

11. The method of claim 10 wherein said mating step includes:

choosing a first range of actions from said actions comprising a first one of said parent chromosomes;

choosing a second range of actions from said actions comprising a second one of said parent chromosomes; and swapping said first range of actions with said second range of actions to produce two children chromosomes said children chromosomes differing from said parent chromosomes.

12. The method of claim 10 wherein said mating step includes:

choosing first and second ranges of actions from a first one of said parent chromosomes where said second range of actions is adjacent to and sequentially after said first range of actions;

choosing third and fourth ranges of actions from a second one of said parent chromosomes where said third range of actions matches said first range of actions and is adjacent to and sequentially after said third range of actions; and swapping said second range of actions with said fourth range of actions to produce two children chromosomes said children chromosomes differing from said parent chromosomes.

13. The method of claim 10 wherein said mating step includes:

choosing first and second ranges of actions from a first one of said parent chromosomes where said second range of actions is adjacent to and sequentially after said first range of actions;

choosing third and fourth sequentially adjacent ranges of actions from a second one of said parent chromosomes where said third range of actions includes an action matching an action in said first range of actions and said fourth range of actions includes an action matching an action in said second range of actions; and swapping said second range of actions with said fourth range of actions to produce two children chromosomes said children chromosomes differing from said parent chromosomes.

14. The method of claim 13 wherein said step of choosing third and fourth ranges of actions includes:

choosing said third range of actions wherein said third range of actions includes multiple actions having a first type and a first sequence wherein said first type and said first sequence match actions included in said first range of actions; and choosing said fourth range of actions adjacent to and sequentially after said third range of actions wherein said fourth range of actions includes multiple actions having a second type and a second sequence wherein said second type and said second sequence match actions included in said second range of actions.

15. The method of claim 10 wherein said mating step includes:

computing an action state delta sum total for each one of multiple segments of a first one of said parent chromosomes;

computing an action state delta sum total for each one of a first set of multiple segments of a second one of said parent chromosomes;

computing an action state delta sum total for each one of a second set of multiple segments of a second one of said parent chromosomes;

comparing said action state delta sum total for said first and second set of segments to said action state delta sum totals for said multiple segments of said first parent chromosome;

selecting, responsive to said comparing step, said first or second set of segments; and swapping said selected segment with a one of said multiple segments of said first one of said parent chromosomes.

16. The method of claim 10 wherein said mating step further includes:

applying mutagens to said children chromosomes to further alter said children chromosomes.

17. The method of claim 16 wherein applying mutagens step includes:

selecting a sequence of actions in one of said child chromosomes; and replacing said selected sequence with an inverse of said selected sequence.

18. The method of claim 16 wherein applying mutagens step includes:

selecting a sequence of actions at a first location within one of said child chromosomes;

cutting said sequence of actions from said one child chromosome; and inserting said sequence of actions in said one child chromosome at a second location.

19. The method of claim 16 wherein applying mutagens step includes:

selecting a first sequence of actions in one of said child chromosomes;

determining an action state delta sum for said selected sequence;

choosing a second sequence of actions from said chromosome population wherein said second sequence of actions the same said action state delta sum as said first sequence of actions; and replacing said first sequence with said second sequence.

20. The method of claim 9 wherein said inserting step includes:

removing child chromosomes having the lowest said fitness ratings to a noisy archive; and inserting remaining child chromosomes in said chromosome population.

21. The method of claim 1 further including the step of evolving the population of said noisy archive to produce a child chromosome wherein said child chromosome is a solution to said sequential problem.

22. The method of claim 1 wherein said evolving step includes:

selecting a first parent chromosome from said chromosome population;

selecting a second parent chromosome from said noisy archive;

mating said parent chromosomes to produce children chromosomes; and inserting said children chromosomes into said chromosome population.

23. A method for locating defects in a target software system, comprising the steps of:

producing a population of chromosomes of varied length where each chromosome is formed of a plurality of actions each of said actions being a stimulus applicable to said target software system;

applying said population of chromosomes one at a time to said target software system;

measuring characteristics of said target software system, responsive to application of each of said chromosomes, said characteristics being definitive of a state of said target software system produced by each of said chromosomes;

identifying, responsive to measurement of said characteristics, a defect-producing chromosome wherein said defect-producing chromosome produces a defect in said target software system, said defect being one of said characteristics; and minimizing said defect-producing chromosome wherein said minimized defect-producing chromosome has fewer ones of said actions than said defect-producing chromosome and produces the same said defect in said target software system as said defect-producing chromosome.

24. The method of claim 23 wherein said producing step includes:
  assigning an action designation to individual stimuli receivable by said target software system; and
  randomly combining a plurality of said actions to form each of said chromosomes.

25. The method of claim 23 wherein said applying step includes:
  exercising said target software system with ones of said chromosomes one at a time until said target system has been exercised with all of said population of chromosomes.

26. The method of claim 25 wherein said exercising step includes: inputting a sequence of actions constituting one of said chromosomes one at a time to said target software system until all of said actions constituting said chromosomes have been input to said target software system.

27. The method of claim 23 wherein said measuring step includes:
  measuring properties of said target software system to determine property changes brought about by application of each action comprising each chromosome.

28. The method of claim 27 wherein said step of measuring properties includes:
  calculating a fitness rating for each of said chromosomes wherein each of said fitness ratings is a function of said property changes attributable to one of said chromosomes.

29. The method of claim 28 wherein said step of calculating a fitness rating includes:
  adding to said fitness rating for a one of said chromosomes if said one of said chromosomes brings about a large delta in said property changes when applied to said target software system;
  adding to said fitness rating for a one of said chromosomes if said one of said chromosomes brings about a defect in said target software system; and
  adding to said fitness rating for a one of said chromosomes if said one of said chromosomes comprises a fewer number of said actions than another of said chromosomes producing the same said property changes and same said defect.

30. The method of claim 23 wherein said minimizing step includes:
  mutating said defect-producing chromosome to form a child chromosome wherein said child chromosome comprises fewer of said actions than is comprised by said defect-producing chromosome;
  applying said child chromosome to said target software system; and
  determining, responsive to said step of applying said child chromosome, if said child chromosome produces the same said defect as said defect-producing chromosome.

31. The method of claim 30 wherein said determining step includes:
  measuring properties of said target software system to determine property changes brought about by application of each action comprising said child chromosome;
  calculating a fitness rating for said child chromosome;
  identifying, responsive to calculation of said fitness rating, whether said child chromosome produces said defect.

32. The method of claim 30 wherein said mutating step includes:
  mating said defect-producing chromosome with a second chromosome from said population to produce children chromosomes.

33. The method of claim 32 wherein said mating step further includes:
  applying mutagens to said defect-producing chromosome to alter said defect-producing chromosome.

34. The method of claim 23 further comprising the steps of:
  applying extinction, responsive to said minimizing step, to said chromosome population.

35. The method of claim 34 wherein said step of applying extinction includes:
  determining when said defect-producing chromosome has been minimized to an acceptable number of actions; and
  removing, responsive to determining that said defect-producing chromosome has been minimized, any chromosomes from said chromosome population that produce the same said defect produced by said defect-producing chromosome.

36. The method of claim 35 further including the step of:
  adjusting a fitness rating means to generate a low fitness rating for any chromosome producing said defect produced by said defect-producing chromosome.

37. The method of claim 35 further including the step of:
  adjusting a fitness rating means to generate a low fitness rating for any chromosome producing said defect produced by said defect-producing chromosome.

38. The method of claim 34 wherein said step of applying extinction includes:
  determining when said defect-producing chromosome has been minimized to an acceptable number of actions;
  destroying said chromosome population; and
  creating a new chromosome population.

39. A system for adaptively testing multiple interacting target software systems comprising:
  at least one genetic testing engine for generating test cases said genetic testing engine operable to evolve said test cases to produce test cases having a high fitness rating;
  a product driver manager for receiving test cases from said genetic testing engine and for selectively communicating said test cases to said target software systems;
  multiple product drivers, each of said multiple product drivers being associated with a different one of said target software systems for interfacing between said product driver manager and said associated target software system for applying said test cases to said associated target software system and for measuring properties of said associated target software system.

40. A method for adaptively solving a sequential problem in a target system comprising the steps of:
  producing a population of chromosomes where each chromosome is formed of a plurality of actions each of said actions representing a stimulus application to said target system;
  applying said population of chromosomes to said target system;
  measuring characteristics of said target system, responsive to application of each of said chromosomes, said characteristics being definitive of a state of said target system;
  determining, responsive to measurement of said characteristics, a fitness rating for each of said chromosomes comprising said population of chromosomes;
  selecting a pair of parent chromosomes from said chromosome population;

computing an action state delta sum total for each one of multiple segments of a first one of said parent chromosomes;

computing an action state delta sum total for each one of a first set of multiple segments of a second one of said parent chromosomes;

comparing said action state delta sum total for said first and second set of segments to said action state delta sum totals for said multiple segments of said first parent chromosome;

selecting, responsive to said comparing step, said first or second set of segments;

swapping said selected segment with a one of said multiple segments of said first one of said parent chromosomes to produce child chromosomes wherein said children chromosomes differ from said parent chromosomes; and said inserting children chromosomes in said chromosome population.

41. A method for adaptively solving a sequential problem in a target system comprising the steps of:

producing a population of chromosomes where each chromosome is formed of a plurality of actions each of said actions representing a stimulus application to said target system;

applying said population of chromosomes to said target system;

measuring characteristics of said target system, responsive to application of each of said chromosomes, said characteristics being definitive of a state of said target system;

determining, responsive to measurement of said characteristics, a fitness rating for each of said chromosomes comprising said population of chromosomes;

selecting a parent chromosome from said chromosome population;

mutating said parent chromosome to form a child chromosome wherein said child chromosome differs from said parent chromosome;

selecting a sequence of actions in said child chromosome;

replacing said selected sequence with an inverse of said selected sequence; and inserting said child chromosome in said chromosome population.

42. A method for adaptively solving a sequential problem in a target system comprising the steps of:

producing a population of chromosomes where each chromosome is formed of a plurality of actions each of said actions representing a stimulus application to said target system;

applying said population of chromosomes to said target system;

measuring characteristics of said target system, responsive to application of each of said chromosomes, said characteristics being definitive of a state of said target system;

determining, responsive to measurement of said characteristics, a fitness rating for each of said chromosomes comprising said population of chromosomes;

selecting a parent chromosome from said chromosome population;

mutating said parent chromosome to form a child chromosome wherein said child chromosome differs from said parent chromosome;

selecting a sequence of actions at a first location within said child chromosome;

cutting said sequence of actions from said child chromosome;

inserting said sequence of actions in said child chromosome at a second location; and inserting said child chromosome in said chromosome population.

43. A method for adaptively solving a sequential problem in a target system comprising the steps of:

producing a population of chromosomes where each chromosome is formed of a plurality of actions each of said actions representing a stimulus application to said target system;

applying said population of chromosomes to said target system;

measuring characteristics of said target system, responsive to application of each of said chromosomes, said characteristics being definitive of a state of said target system;

determining, responsive to measurement of said characteristics, a fitness rating for each of said chromosomes comprising said population of chromosomes;

selecting a parent chromosome from said chromosome population;

mutating said parent chromosome to form a child chromosome wherein said child chromosome differs from said parent chromosome;

selecting a first sequence of actions in said child chromosome;

determining an action state delta sum for said selected sequence;

choosing a second sequence of actions from said chromosome population wherein said second sequence of actions has the same said action state delta sum as said first sequence of actions;

replacing said first sequence with said second sequence; and inserting said child chromosome into said chromosome population.

* * * * *

UNITED STATES PATENT AND TRADEMARK OFFICE
CERTIFICATE OF CORRECTION

PATENT NO.: 6,088,690

DATED: July 11, 2000

INVENTOR: Alexander G. GOUNARES, et al.

It is certified that errors appear in the above-identifi-ed patent and that said Letters Patent is hereby corrected as shown below:

column 10, line 52:

"$P_{4-p7}$" has been replaced with --$p_4$-$p_7$--.

"a," has been replaced with --$a_1$--.

Signed and Sealed this

Third Day of April, 2001

Attest:

NICHOLAS P. GODICI

*Attesting Officer*   *Acting Director of the United States Patent and Trademark Office*